United States Patent
Ikarashi et al.

(10) Patent No.: US 10,298,520 B2
(45) Date of Patent: May 21, 2019

(54) RELAY APPARATUS

(71) Applicant: APRESIA Systems, Ltd., Chuo-ku, Tokyo (JP)

(72) Inventors: Muneyuki Ikarashi, Tsukuba (JP); Shigeru Tsubota, Tsuchiura (JP)

(73) Assignee: APRESIA Systems, Ltd., Tokyo (JP)

( * ) Notice: Subject to any disclaimer, the term of this patent is extended or adjusted under 35 U.S.C. 154(b) by 258 days.

(21) Appl. No.: 14/950,815

(22) Filed: Nov. 24, 2015

(65) Prior Publication Data

US 2016/0149835 A1    May 26, 2016

(30) Foreign Application Priority Data

Nov. 25, 2014   (JP) ................................. 2014-238177

(51) Int. Cl.
*H04L 12/939* (2013.01)
*H04L 12/931* (2013.01)

(52) U.S. Cl.
CPC ............ *H04L 49/555* (2013.01); *H04L 49/40* (2013.01)

(58) Field of Classification Search
None
See application file for complete search history.

(56) References Cited

U.S. PATENT DOCUMENTS

| | | | | |
|---|---|---|---|---|
| 5,953,314 A * | 9/1999 | Ganmukhi | .......... | G06F 11/2038 370/220 |
| 7,277,425 B1 * | 10/2007 | Sikdar | ................ | H04L 12/5601 370/351 |
| 7,428,209 B1 * | 9/2008 | Roberts | ............... | H04L 41/0668 370/217 |
| 7,552,262 B1 * | 6/2009 | Turner | .................... | H04L 49/10 370/351 |
| 8,345,675 B1 * | 1/2013 | Raghunath | .............. | H04L 49/65 370/388 |
| 8,553,582 B1 * | 10/2013 | Mizrahi | ................. | H04L 47/24 370/254 |

(Continued)

FOREIGN PATENT DOCUMENTS

| JP | 2003-234757 A | 8/2003 |
|---|---|---|
| JP | 2006-279328 A | 10/2006 |

(Continued)

OTHER PUBLICATIONS

Japanese-language Office Action issued in counterpart Japanese Application No. 2014-238177 dated Jul. 24, 2018 with English translation (six (6) pages).

*Primary Examiner* — Christopher T Wyllie
(74) *Attorney, Agent, or Firm* — Crowell & Moring LLP

(57) ABSTRACT

A relay apparatus includes line cards, switch fabric cards, and a management card. The management card and the switch fabric cards are connected through a first communication network, and the switch fabric cards and the line cards are connected through a second communication network. The switch fabric card includes an error control unit. The error control unit stops switching of data transmission using a path of the second communication network by controlling the switch fabric card as an abnormal state based on an error signal that is output when a fault of the first communication network or an internal fault of the switch fabric card is detected as an error.

7 Claims, 13 Drawing Sheets

(56) References Cited

U.S. PATENT DOCUMENTS

| | | | | |
|---|---|---|---|---|
| 8,687,629 B1* | 4/2014 | Kompella | ............ | H04L 49/1515 370/386 |
| 9,667,567 B2* | 5/2017 | Ando | ............ | H04L 49/25 |
| 2002/0181476 A1* | 12/2002 | Badamo | ............ | H04L 12/66 370/401 |
| 2003/0063559 A1* | 4/2003 | Awsienko | ............ | H04L 49/602 370/216 |
| 2003/0117949 A1* | 6/2003 | Moller | ............ | H04L 1/22 370/219 |
| 2004/0073834 A1* | 4/2004 | Kermaani | ............ | G06F 11/2028 714/13 |
| 2004/0190502 A1* | 9/2004 | Sharma | ............ | H04Q 3/54583 370/360 |
| 2006/0140226 A1* | 6/2006 | Ho | ............ | H04J 3/08 370/539 |
| 2007/0047536 A1* | 3/2007 | Scherer | ............ | H04L 49/358 370/360 |
| 2007/0091796 A1* | 4/2007 | Filsfils | ............ | H04L 45/00 370/228 |
| 2007/0168475 A1* | 7/2007 | Mullahy | ............ | H04L 45/00 709/220 |
| 2008/0192627 A1* | 8/2008 | Lichtwald | ............ | H04L 43/50 370/228 |
| 2009/0089464 A1* | 4/2009 | Lach | ............ | G06F 13/4022 710/62 |
| 2009/0198832 A1* | 8/2009 | Shah | ............ | H04L 41/0668 709/239 |
| 2010/0169718 A1* | 7/2010 | Tausanovitch | ............ | H04L 41/0681 714/49 |
| 2011/0058474 A1* | 3/2011 | Nagapudi | ............ | H04L 45/745 370/235 |
| 2012/0099421 A1* | 4/2012 | Hayashitani | ............ | H04L 45/02 370/221 |
| 2012/0185634 A1* | 7/2012 | Shirai | ............ | G06F 13/385 710/316 |
| 2013/0142198 A1 | 6/2013 | Atsumi | | |
| 2014/0006676 A1* | 1/2014 | Chandrasekhar | ... | G06F 13/4022 710/316 |
| 2014/0059370 A1* | 2/2014 | Loffink | ............ | H04L 49/40 713/323 |
| 2014/0169173 A1* | 6/2014 | Naouri | ............ | H04L 47/10 370/237 |
| 2014/0317441 A1* | 10/2014 | Arata | ............ | G06F 11/20 714/4.12 |
| 2014/0365641 A1* | 12/2014 | Cho | ............ | G06F 13/4022 709/224 |
| 2015/0149691 A1* | 5/2015 | Baxter | ............ | G06F 3/0688 711/103 |
| 2015/0163112 A1* | 6/2015 | Ando | ............ | H04L 49/25 370/242 |
| 2015/0222705 A1* | 8/2015 | Stephens | ............ | G06F 3/0611 709/214 |
| 2016/0149835 A1* | 5/2016 | Ikarashi | ............ | H04L 49/40 370/389 |
| 2016/0314012 A1* | 10/2016 | Rong | ............ | G06F 9/45558 |

FOREIGN PATENT DOCUMENTS

| | | |
|---|---|---|
| JP | 2007-81933 A | 3/2007 |
| JP | 2004-112721 A | 4/2008 |
| JP | 2013-118440 A | 6/2013 |

* cited by examiner

RELAY APPARATUS

CROSS-REFERENCE TO RELATED APPLICATION

The present application claims priority from Japanese Patent Application No. 2014-238177 filed on Nov. 25, 2014, the content of which is hereby incorporated by reference into this application.

TECHNICAL FIELD OF THE INVENTION

The present invention relates to a technology of a relay apparatus used in a communication network. In addition, the present invention relates to an internal management function of a chassis-type relay apparatus.

BACKGROUND OF THE INVENTION

In communication networks, there are relay apparatuses that execute high-speed data transmission based on communication standards such as Ethernet (registered trademark) and the like. Such relay apparatuses are also called switches or the like. Particularly, in a chassis-type relay apparatus, a plurality of cards corresponding to the functions is connected inside a chassis by being attached thereto. Examples of such cards include a line card that executes data transmission corresponding to a communication standard such as Ethernet as an external interface and a switch fabric card that switches data transmission between ports of a line card. Each of such cards may have a redundant configuration that is multiplexed by a plurality of cards.

As an example of the related art relating to the relay apparatus, there is Japanese Patent Application Laid-Open Publication No. 2003-234757 (Patent Document 1). In Patent Document 1, it has been described to execute switching between a currently-used switch fabric and a preliminary switch fabric, which are duplexed, without any data loss under the control of one controller.

SUMMARY OF THE INVENTION

In the relay apparatus, a management card may be installed as a controller. The management card is connected to a plurality of switch fabric cards and executes control relating to switching using the plurality of switch fabric cards and control relating to operation/maintenance/management. As such switch fabric cards, there is a type having a predetermined control function using a CPU and a type not having such a function. The switch fabric card of the type not having any CPU is controlled by the management card.

When a malfunction such as a disconnection between one controller or the management card and the switch fabric card occurs, the relay apparatus of the related art as disclosed in JP 2003-234757 A is in a state in which the switch fabric card cannot be controlled by a CPU of the management card. Between the line card and the switch fabric card, when the connection is normal, data transmission is continued.

When seen from the system of the relay apparatus, the switch fabric card and the management card are in an abnormal state. Such an abnormal state is not desirable as the internal management function of the relay apparatus, more particularly, a control function using the management card. However, since communication between the management card and the switch fabric card for control cannot be executed, and the management card cannot control the abnormal state.

As the internal management function of the relay apparatus, in order to realize a high degree of availability, it is desirable to stop data transmission and a switch between the switch fabric card and the line card by controlling the switch fabric card as the abnormal state. However, since the state is formed in which the communication for control described above cannot be executed, and the data transmission and the switch cannot be stopped.

An object of the present invention relates to a relay apparatus and is to provide a technology capable of realizing a high degree of availability by controlling a switch fabric card as an abnormal state also in the case of a fault or the like occurring between a management card and a switch fabric card.

A representative embodiment of the present invention is a relay apparatus that includes the following configuration as its feature.

A relay apparatus according to an embodiment includes: a plurality of line cards for executing data transmission to/from the outside; a plurality of switch fabric cards for switching the data transmission; and a management card including a processor that controls the plurality of switch fabric cards. The management card and the plurality of switch fabric cards are connected through a first communication network, and the plurality of switch fabric cards and the plurality of line cards are connected through a second communication network. The switch fabric card includes an error detecting unit and an error control unit. The error detecting unit detects a fault of the first communication network or an internal fault of the switch fabric card as an error and outputs an error signal, and the error control unit stops the switching of the data transmission using a path of the second communication network by controlling the switch fabric card as an abnormal state based on the error signal.

A representative embodiment of the present invention relates to a relay apparatus and is to provide a technology capable of realizing a high degree of availability by controlling a switch fabric card as an abnormal state also in the case of a malfunction between a management card and a switch fabric card or the like.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that the same components are denoted by the same reference symbols throughout all the drawings for describing the embodiments, and the repetitive description thereof will be omitted.

Figure 4:
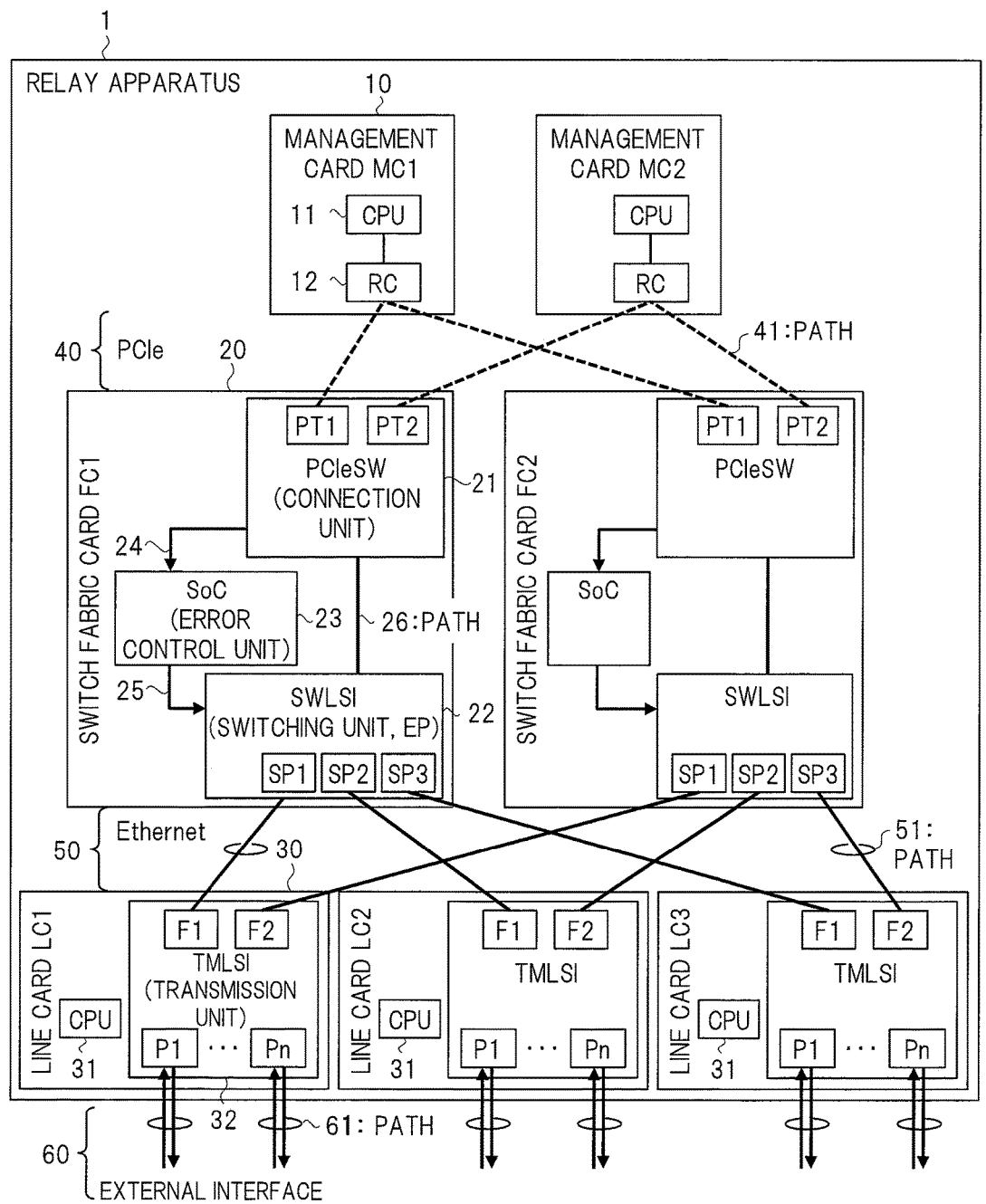
FIG. 4 is a diagram that illustrates the functional block configuration of the relay apparatus according to the embodiment.
Figure 5:
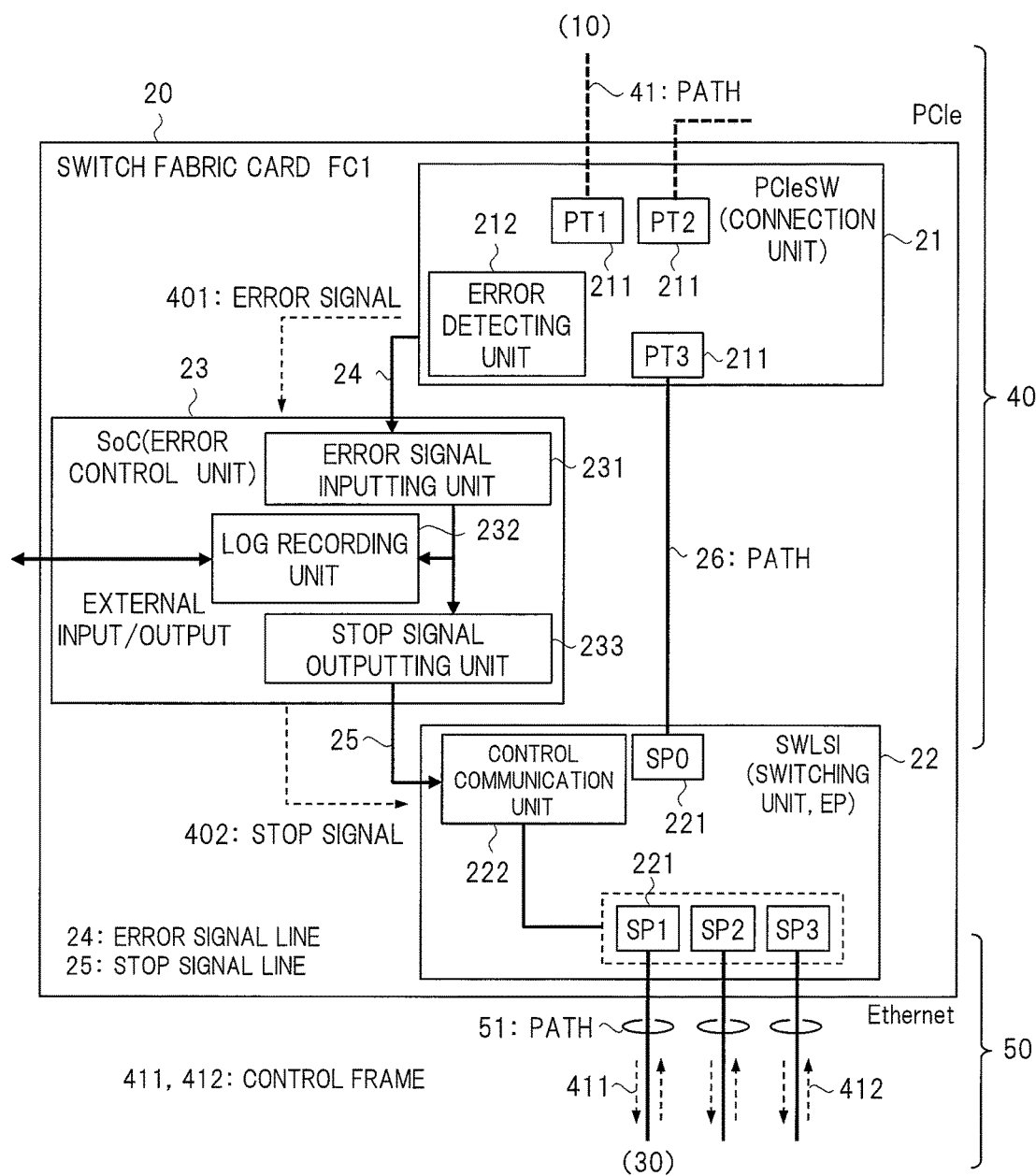
FIG. 5 is a diagram that illustrates the functional block configuration of a switch fabric card of the relay apparatus according to the embodiment.

In a relay apparatus according to the present embodiment, as illustrated in FIGS. 4 and 5, in a configuration in which a plurality of switch fabric cards 20 are controlled from a plurality of management cards 10 through a first communication network 40 according to PCI Express (registered trademark), an SoC 23 corresponding to an error control function and the like are provided inside the switch fabric card 20. In the case of a fault in the first communication network 40 between the management card 10 and the switch fabric card 20 or an abnormality of the inside of the PCIeSW 21, a PCIeSW 21 disposed inside the switch fabric card 20 outputs an error signal 401. When the error signal 401 is received as an input, the SoC 23 records log information and outputs a stop signal 402. When the stop signal 402 is received as an input, the SWLSI 22 recognizes the switch fabric card 20 to be in an abnormal state and stops control frame communication with a plurality of line cards 30. Accordingly, data transmission between the switch fabric card 20 and the plurality of line cards 30 is stopped.

[Communication System]

Figure 1:
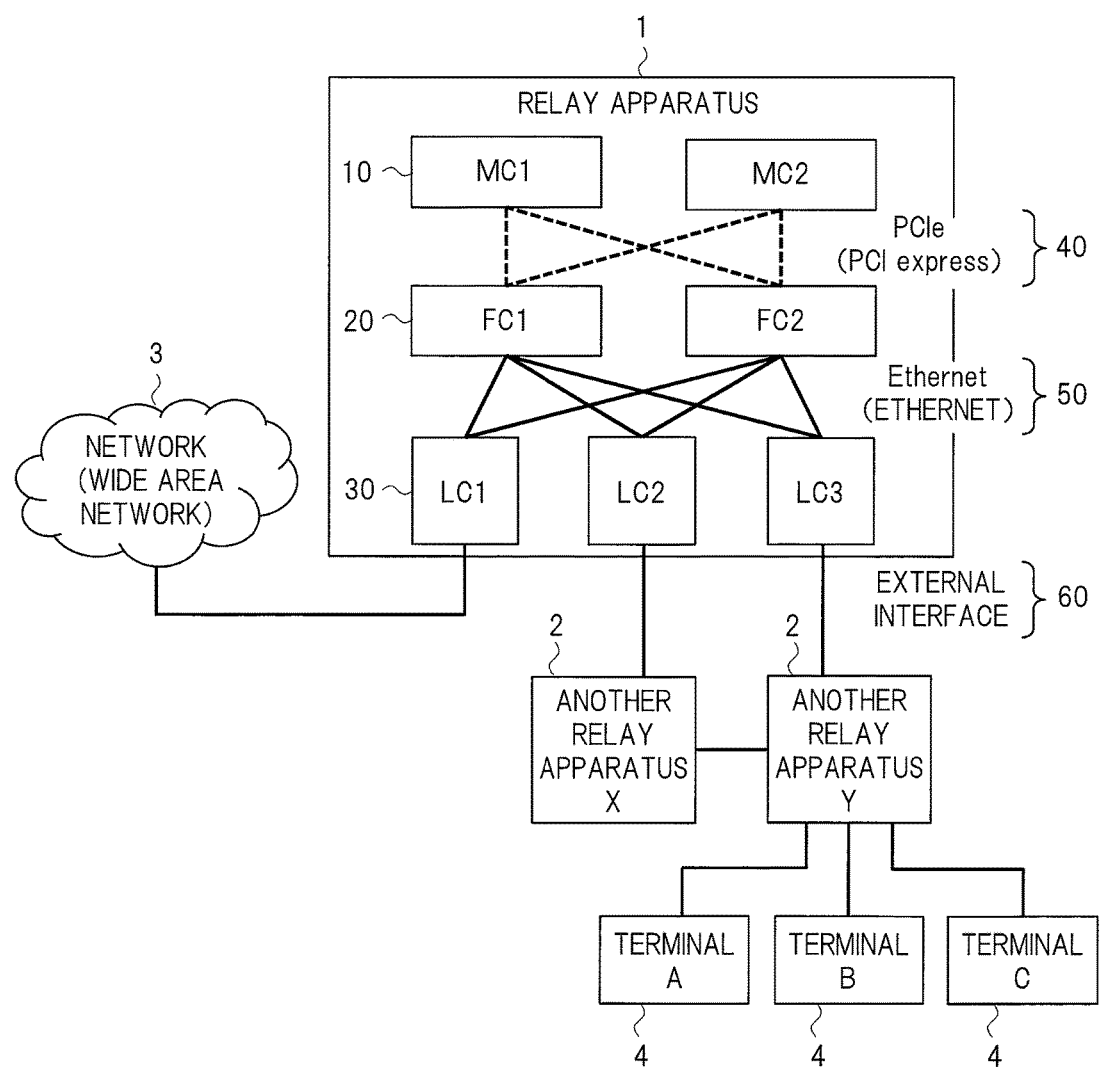
FIG. 1 is a diagram that illustrates an example of the configuration of a communication system including a relay apparatus according to an embodiment of the present invention.

FIG. 1 is a diagram that illustrates an example of the configuration of a communication system including a relay apparatus according to an embodiment. In the communication system illustrated in FIG. 1, the relay apparatus 1 is connected to a network 3 that is a wide area network and another relay apparatus 2. Another relay apparatus 2 may be either an apparatus of the same kind as the relay apparatus 1 according to the present embodiment or an apparatus of a difference kind. The another relay apparatus 2 is further connected to a further another relay apparatus 2 and a user terminal 4. The relay apparatus 1 illustrated in FIG. 1 and the two another relay apparatuses 2 form a ring-type connection.

The relay apparatus 1 corresponds to an L2 switch that executes a relay process of "layer 2" based on the OSI or the like. The relay apparatus 1 includes a plurality of management cards 10, a plurality of switch fabric cards 20, and a plurality of line cards 30. Each of the management cards 10, the switch fabric cards 20, and the line cards 30 has a redundant configuration formed through multiplexing.

The plurality of management cards 10 and the plurality of switch fabric cards 20 are connected through a first communication network 40 according to the PCI Express. Note that the PCI Express will be abbreviated as PCIe. By transmitting/receiving control packets through a path of the first communication network 40, the management card 10 controls the plurality of switch fabric cards 20 so as to manage the state. In addition, the management card 10 provides a user interface used for operation/maintenance/management of the relay apparatus 1, thereby enabling the management of the entire relay apparatus 1 that includes the setting and the checking of each card. In the present embodiment, a so-called multi-host system is configured in which two management cards 10 having a redundant configuration are set as hosts in a PCIe network.

The plurality of switch fabric cards 20 and the plurality of line cards 30 are connected through a second communication network 50 according to the Ethernet. The switch fabric card 20 switches data transmission among the plurality of line cards 30 by using a path of the second communication network 50. The switch fabric card 20, for example, receives a data frame from the first line card 30 and transmits the data frame to the second line card 30 corresponding to the destination of the data frame.

The line card 30 is connected to an external device through a corresponding external interface 60 for each line card 30. The line card 30 executes data transmission between the external interface 60 and the plurality of switch fabric cards 20. The line card 30 maintains a table in which information of a correspondence relation between a MAC address of a transmission source and a reception port is stored. The line card 30 receives a data frame, for example, from an external device and transmits the received data frame to the switch fabric card 20. In addition, the line card 30 receives a data frame transmitted from the switch fabric card 20 and transmits the received data frame to an external device.

The external interface 60 is an interface corresponding to a communication standard such as the Ethernet. The network 3, for example, is a wide area network such as a core switch network corresponding to the Ethernet. In the example illustrated in FIG. 1, the network 3 is connected to LC1 that is a first line card 30, "X" that is another relay apparatus 2 is connected to LC2 that is a second line card 30, and "Y" that is another relay apparatus 2 is connected to LC3 that is a third line card 30.

In addition, as identification information of individual cards, the management cards 10 are denoted as MC1 and MC2. Similarly, the switch fabric cards 20 are denoted as FC1 and FC2. The line cards 30 are denoted as LC1, LC2, and LC3.

[Chassis-Type Relay Apparatus]

Figure 2:
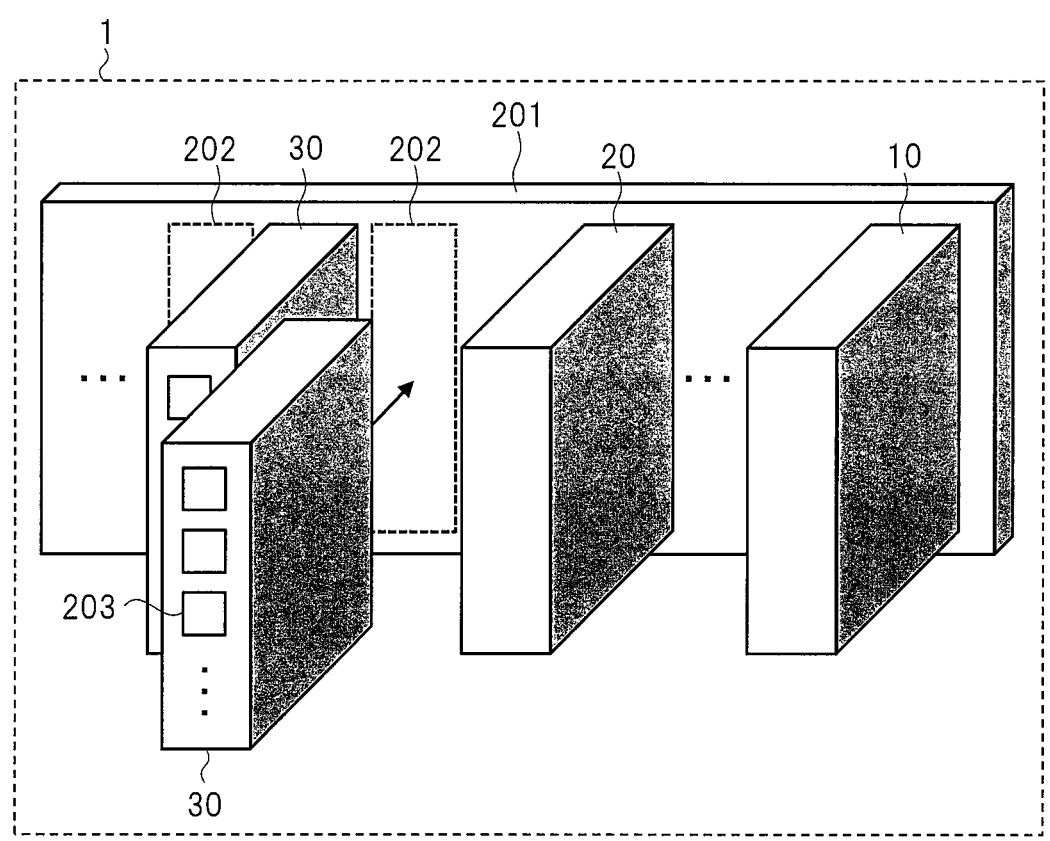
FIG. 2 is a diagram that illustrates an attachment/detachment configuration of a card of the relay apparatus according to the embodiment.

FIG. 2 illustrates a configuration of connections according to attachment/detachment of cards in the chassis-type relay apparatus 1 according to the embodiment. The relay apparatus 1 includes a wiring board 201 inside a casing. The wiring board 201 includes a plurality of slots 202. According to user's attachment/detachment operations, a plurality of cards that are the management card 10, the switch fabric card 20, and the line card 30 are physically and electrically connected to the plurality of slots 202, and each card includes a port 203 to which a cable is connected.

Configuration Example of Plurality of Cards

Figure 3:
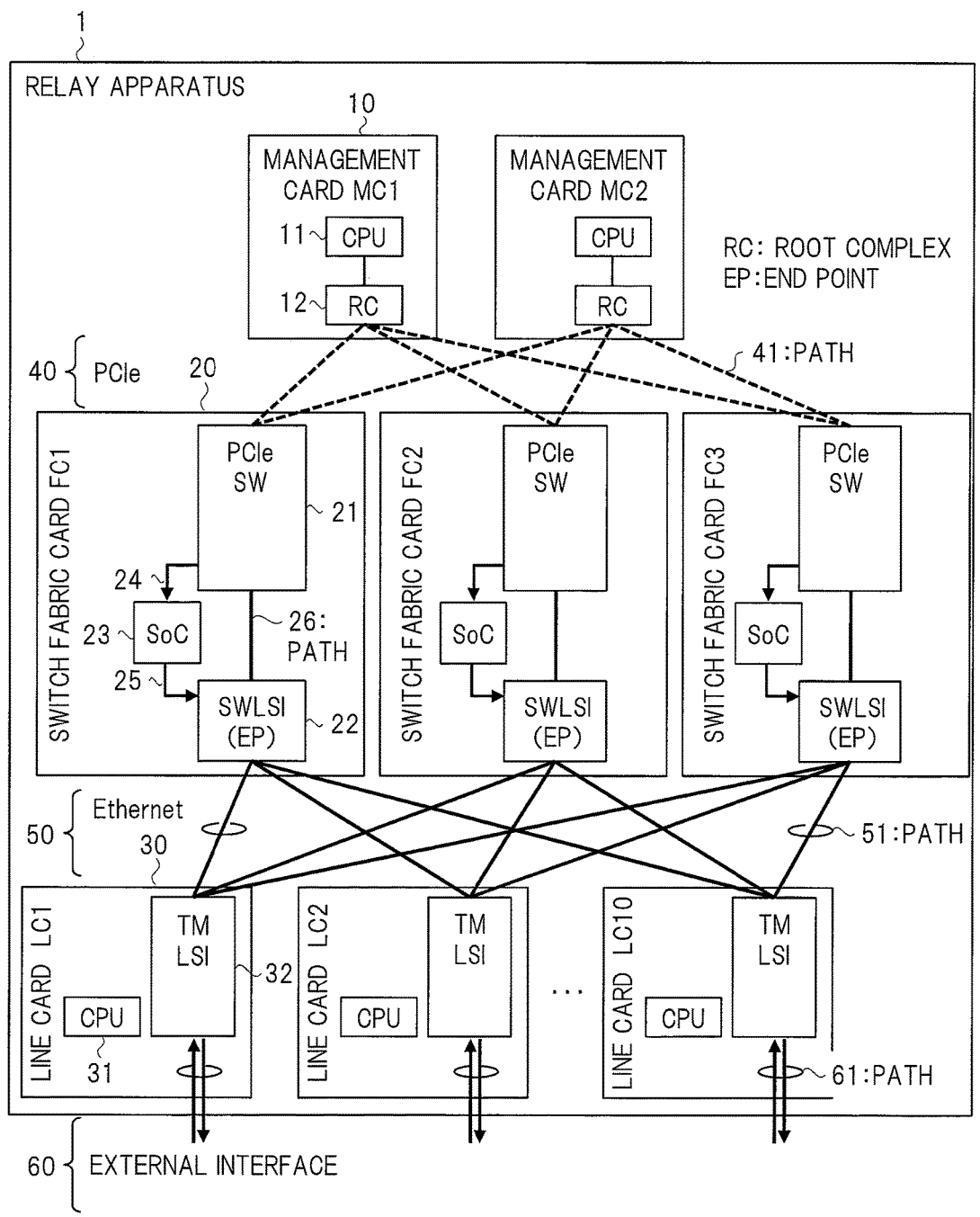
FIG. 3 is a diagram that illustrates an example of connections of a plurality of cards in the relay apparatus according to the embodiment.

FIG. 3 illustrates a configuration example of connections of a plurality of cards in the chassis-type relay apparatus 1 according to the embodiment. Two management cards 10, three switch fabric cards 20, and ten line cards 30 are connected to the relay apparatus 1 illustrated in FIG. 3. A path 41 of the first communication network 40 is connected between each management card 10 and each switch fabric card 20. In addition, a path 51 of the second communication network 50 is connected between each switch fabric card 20 and each line card 30.

In the redundant configuration of each card, a current-use state and a preliminary state may be set in the card. For example, at least one management card 10 of two management cards 10, for example, the management card MC1 operates in the current-use state and controls and manages the states of three switch fabric cards 20. The other management card MC2 operates in the preliminary state. In the case of a fault of the management card MC1, the management card MC2 is switched to the current-use state. In addition, in such a case, the two management cards 10 are connected through a predetermined communication network, for example, the Ethernet, and detect a fault through mutual state monitoring.

In addition, at least one switch fabric card 20 of three switch fabric cards 20 operates in the current-use state. For example, FC1 and FC2 operate in the current-use state, and FC3 operates in the preliminary state. Under the control of the management card 10, the preliminary FC3 is switched to the current-use state as is necessary.

In addition, ten line cards 30 operate in the current-use state. For example, LC1 to LC5 that are five line cards 30 execute data transmission to/from the management card FC1 that is the switch fabric card 20, and LC6 to LC10 that are the other five line cards 30 execute data transmission to/from the management card FC2 that is the switch fabric card 20. The number of each card and the control of the current-use state and the preliminary state are not limited to those illustrated in the example described above.

[Functional Block Configuration of Relay Apparatus]

FIG. 4 illustrates the functional block configuration of a relay apparatus 1 according to an embodiment. The relay apparatus 1 illustrated in FIG. 4 is a configuration example in which two management cards 10, two switch fabric cards 20, and three line cards 30 are connected. In the description presented hereinafter, this configuration example will be used.

The management card 10 includes a CPU 11 and an RC 12. The CPU 11 and the RC 12 are connected to each other. The CPU 11 is a processor and executes the control process of the own management card 10 and a control process for a plurality of switch fabric cards 20 through the first communication network 40 according to the PCIe.

The RC 12 is connected to the path 41 through a PCIe bus in the first communication network 40 according to the PCIe. The RC 12 is a root complex that is a constituent element of the PCIe network and is a communication unit that is positioned at the root of a tree-type network. The path 41 includes a control plane on the PCIe bus, and control packets are transmitted or received therethrough. The RC 12 executes a process of transmitting a packet, in which control information is stored, supplied from the CPU 11 through the path 41 and a process of receiving a packet supplied from the PCIeSW 21 of the switch fabric card 20 by using the path 41.

The switch fabric card 20 includes a PCIeSW 21, a SWLSI 22, and an SoC 23. The PCIeSW 21 and the SWLSI 22 are connected through a control path 26 corresponding to the PCIe. The first communication network 40 is a PCIe network connecting the RC 12, the PCIeSW 21, and the SWLSI 22 and includes the path 26. The path 26 includes a control plane on a PCIe bus, and control packets are transmitted and received therethrough.

The PCIeSW 21 is a PCI Express switch that is a constituent element of the PCIe network and is a connection unit that has a function of relaying PCIe packets between the RC 12 and the SWLSI 22 that is an end point. The PCIeSW 21 includes ports PT1 and PT2 to be described later as a plurality of ports.

The SWLSI 22 is a switching unit using a switch LSI switching data transmission between the switch fabric card 20 and a plurality of the line cards 30. The SWLSI 22 is an endpoint as a constituent element of the PCIe network and is a terminal part of a tree-type network. The SWLSI 22 includes SP1 to SP3 to be described later as a plurality of ports.

The PCIeSW 21 and the SoC 23 are connected through an error signal line 24 that is a hardware line. In addition, the SoC 23 and the SWLSI 22 are connected through a stop signal line 25 that is a hardware line.

The SoC 23 is a system-on-a-chip that is a circuit in which a predetermined function is integrated on one semiconductor chip and is an error control unit on which a unique error control function is mounted. The error control function is a function for detecting a fault of the first communication network 40 according to the PCIe, an abnormality of the inside of the switch fabric card 20, or the like as an error and controlling the switch fabric card 20 as an abnormal state in the internal management function of the relay apparatus 1. In addition, the SoC 23 includes a function for recording log information that includes a history of the occurrences of errors.

The line card 30 includes a CPU 31 and a TMLSI 32. The CPU 31 is a processor that executes the control process of the own line card 30. The TMLSI 32 is a transmission unit using an LSI that executes the process of data transmission of the external interface 60 and the plurality of switch fabric cards 20 for the path 51 of the second communication network 50.

The TMLSI 32 includes a plurality of ports. The plurality of ports include ports F1 and F2 connected to the path 51 that is on the second communication network 50 side and ports P1 to Pn connected to the path 61 that is on the external interface 60 side.

The path 51 of the second communication network 50 is a frame path configured on a bus of the Ethernet. One path 51 includes a plurality of lanes. For example, one path 51 is configured by 12 lanes. One lane has a bandwidth of 12 Gbps. In other words, one path 51 has a bandwidth that is sufficient for the data transmission of 100 Gbps. Through each path 51 and each lane, a data frame and a control frame are transmitted and received as frames of Ethernet. The control frame is a frame according to control information.

The path 61 of the external interface 60, for example, is a path according to the Ethernet. When the amount of data received by one line card 30 from the external interface 60, for example, is a maximum of 100 Gbps, one path 61 has a bandwidth enabling data transmission of 100 Gbps.

A high transmission capability and a high degree of reliability of the data transmission between the switch fabric card 20 and the line card 30 in the second communication network 50 inside the relay apparatus 1 are secured by employing a redundant configuration and design of the bandwidth. As the design of the bandwidth, a bandwidth capable of sufficiently covering the transmission of 100 Gbps is secured by one switch fabric card 20 that is in the current-use state.

[Functional Block Configuration of Switch Fabric Card]

FIG. 5 is a diagram that illustrates the functional block configuration of the switch fabric card 20 of the relay apparatus 1. The PCIeSW 21 includes ports PT1, PT2, and PT3 as a plurality of ports 211. The port PT1 is connected to a path 41 connected with MC1 that is the management card 10. The port PT2 is connected to the path 41 connected with MC2. The port PT3 is connected to the path 26 connected with the SWLSI 22. Such ports are interconnected, and a control packet is transmitted.

The PCIeSW 21 includes an error detecting unit 212 that is a constituent element of the error control function. The error detecting unit 212 detects a fault such as a disconnection of the first communication network 40 according to the PCIe including the path 26 connected with the SWLSI 22 and an abnormality such as a malfunction of the internal circuit of the PCIeSW 21 as errors. When such an error is detected, the error detecting unit 212 outputs an error signal 401 to the error signal line 24. The error signal 401 is a control signal that is unique in the present embodiment and is a signal that represents the occurrence of a fatal error in the first communication network 40 of the PCIe and the PCIeSW 21.

More specifically, the error detecting unit 212 detects an error such as a disconnection, a defect, or the like of the PCIe bus in the path 41 of the first communication network 40 and the path 26 connected with the SWLSI 22 by employing a structure for detecting a link down in the port 211 of the PCIe connected to the path and a structure of a CRC or the like of data of the port 211. Here, the CRC is a cyclic redundancy check. In addition, the error detecting unit 212 detects an abnormality such as a malfunction of the internal circuit of the PCIeSW 21 as a fault by employing the structure such as the ECC of data of the internal buffer memory of the PCIeSW 21. The ECC is an error detection using an error correction code (ECC).

The SWLSI 22 includes ports SP0, SP1, SP2, and SP3 as a plurality of ports 221. The port SP0 is connected to the path 26 connected with the PCIeSW 21. The ports SP1 to SP3 are respectively connected to the path 51 connected with corresponding line cards 30.

The SWLSI 22 includes a control communication unit 222. The control communication unit 222, at a normal time, as the control frame communication illustrated in FIG. 6 to be described later, executes the process of normally transmitting a control frame 411 by using the plurality of ports 221 connected with the plurality of line cards 30 and the corresponding paths 51. In addition, the control communication unit 222, as the control frame communication illustrated in FIG. 7 to be described later, receives control frames 412 supplied from the plurality of line cards 30 by using the plurality of ports 221 and the corresponding paths 51.

The SoC 23 includes an error signal inputting unit 231, a log recording unit 232, and a stop signal outputting unit 233. The error signal inputting unit 231 is connected to the error signal line 24, the log recording unit 232, and the stop signal outputting unit 233. When an error signal 401 is input and received from the error detecting unit 212 of the PCIeSW 21, the error signal inputting unit 231 outputs the error signal 401 to the log recording unit 232 and the stop signal outputting unit 233.

The log recording unit 232, for example, includes a nonvolatile memory and a register, and records and maintains log information including the error signal 401. The log information including the error signal 401 that is maintained in the log recording unit 232 can be referred to through an external input/output interface. For example, at the time of a failure of the relay apparatus 1, in other words, at the time of an abnormality of the switch fabric card 20 or the like, a user who operates, maintains, and manages the relay apparatus 1 refers to the log information including the error signal 401 through the user interface provided by the management card 10. The user can check the situation such as an abnormality of the switch fabric card 20 by viewing the content of the log information, and a maintenance reaction such as replacement of the switch fabric card 20 can be executed.

When the error signal 401 is input from the error signal inputting unit 231, the stop signal outputting unit 233 outputs a stop signal 402 to the stop signal line 25. The stop signal 402 is a control signal that is unique to the present embodiment and is a signal that causes the SWLSI 22 to recognize the switch fabric card 20 to be in an abnormal state and gives an instruction for stopping the control frame communication.

The SWLSI 22 inputs the stop signal 402 supplied from the stop signal line 25 to the control communication unit 222. When the stop signal 402 is input and received, the control communication unit 222 stops the control frame communication. In other words, the control communication unit 222 stops the transmission of the control frame 411 from the port 221 to the plurality of line cards 30.

[Method (1) of Checking Normality between FC to LC]

Figure 6:
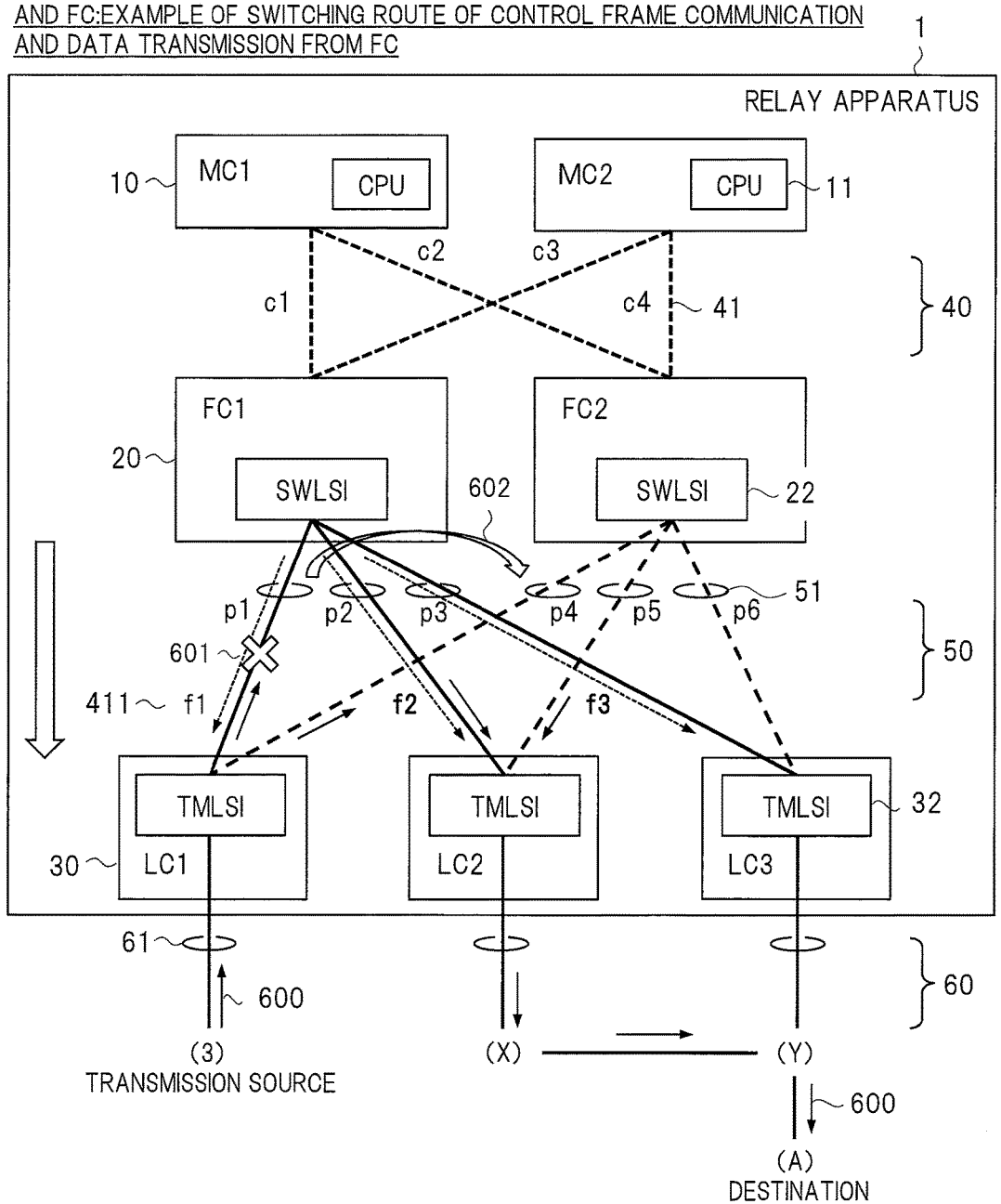
FIG. 6 is a diagram that illustrates examples of control frame communication from the switch fabric card and switching of a route of the relay apparatus according to the embodiment.
Figure 7:
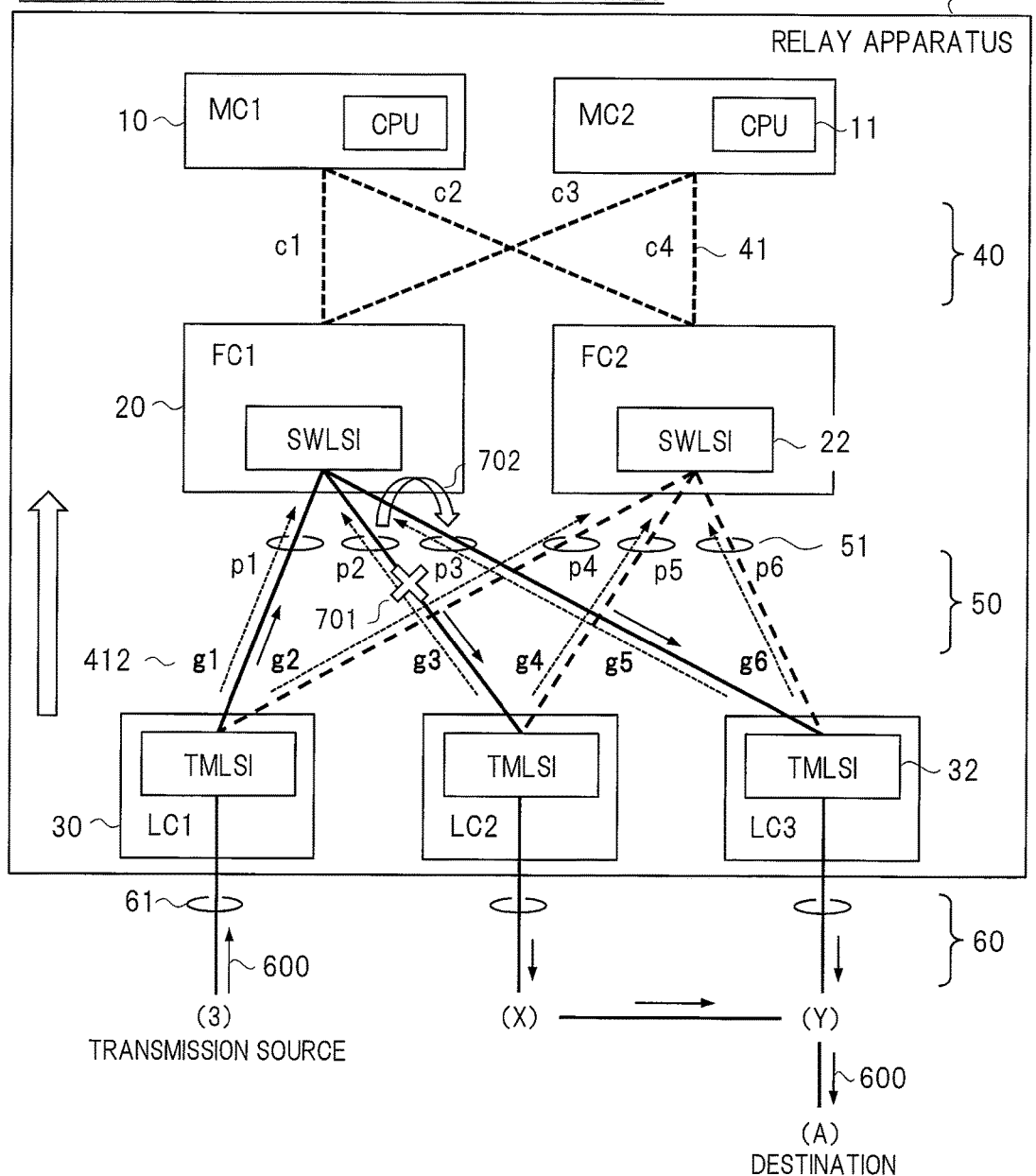
FIG. 7 is a diagram that illustrates examples of control frame communication from a line card and switching of a route of the relay apparatus according to an embodiment.

FIGS. 6 and 7 illustrate control frame communication as a method of checking the normality of a connection between the switch fabric card 20 and the line card 30 in the relay apparatus 1 according to the present embodiment. This control frame communication is one of methods of checking the normality of a connection between the switch fabric card 20 and the line card 30. In this control frame communication, between the switch fabric card 20 and the line card 30, a control frame is normally transmitted and received bidirectionally. The relay apparatus 1 according to the present embodiment has a function for executing the control frame communication bidirectionally. In addition, this control frame communication is automatically executed at the circuit level of the hardware, in other words, at the level of the SWLSI 22 and the TMLSI 32.

FIG. 6 illustrates control frame communication in a direction from the switch fabric card 20 to the line card 30. The SWLSI 22 of the switch fabric card 20 continuously transmits the control frame 411 at a predetermined time interval while a data frame is transmitted by the control communication unit 222 from the port 221 on the path 51. The line card 30 that is a partner receives the control frame 411 from the port connected to the path 51 at the predetermined time interval.

The line card 30 determines and checks a state including the normality of the connection with the switch fabric card 20 on the path 51 based on whether or not the control frame 411 transmitted from the switch fabric card 20, which is the partner, arrives at the line card 30 itself. When the line card 30 receives the control frame 411 at the predetermined time interval, the line card 30 determines that the connection with the switch fabric card 20, which is the partner, and the connection of the path 51 are in a normal state. When the line card 30 cannot receive the control frame 411 after an elapse of a predetermined time, the line card 30 determines that the connection with the switch fabric card 20, which is a partner, and the connection of the path 51 are in an abnormal state.

As a result of the checking of the normality of the connection according to the control frame communication, the path 51 determined to be normal and the lanes thereof are used for data transmission. However, the path 51 determined to be abnormal and the lanes thereof are not used for data transmission. The line card 30 does not use the port connected to the path 51 connected with the switch fabric card 20 determined to be abnormal for data transmission executed thereafter. In other words, the port is temporarily excluded from candidates for the transmission destination. In addition, when the path 51 connected with the switch fabric card 20 determined to be abnormal once is determined to return be normal, the line card 30 uses the port connected to the path 51 for data transmission again. In other words, the port is added as a candidate for the transmission destination.

FIG. 6, for example, illustrates paths p1 to p6 as a plurality of paths 51. The paths p1 to p3 are paths 51 between FC1 that is the switch fabric card 20 and LC1 to LC3 that are the line cards 30. In addition, the paths p4 to p6, similarly, are paths 51 between FC2 and LC1 to LC3.

At the normal time, between the SWLSI 22 and the TMLSI 32, in each lane of each path 51 in the normal state, a data frame and a control frame are transmitted and received. For example, the control communication unit 222 of the SWLSI 22 of the FC1 transmits control frames 411 denoted by f1 to f3 to the lanes of the paths 51 of the paths p1 to p3 from each port 221 at a predetermined time interval.

On the other hand, the TMLSIs 32 of LC1 to LC3 that are the line cards 30 receive control frames 411 from ports connected to the paths 51. For example, when the control frame 411 of f1 cannot be received from the path 51 of p1, the TMLSI 32 of the LC1 determines that the paths 51 of FC1 and p1 are abnormal. In addition, the determination of the normality of the connection and the control of the use for the transmission may be executed in units of paths or in units of lanes. In addition, as an example of the control, when one specific lane is abnormal, the unit of one path 51 including the lane is determined to be abnormal, and the transmission is stopped in the unit of the path 51.

[Method (2) of Checking Normality between FC to LC]

FIG. 7 illustrates control frame communication in a direction from the line card 30 to the switch fabric card 20. The TMLSI 32 of the line card 30 continuously transmits the control frame 412 at a predetermined time interval while a data frame is transmitted from the port onto the path 51. The switch fabric card 20 that is a partner receives the control frame 412 from the port 221 connected to the path 51 at the predetermined time interval.

The control communication unit 22 of the SWSLI 22 of the switch fabric card 20 determines and checks a state including the normality of the connection with the line card 30 and the path 51 based on whether or not the control frame 412 transmitted from the line card 30, which is the partner, arrives at the line card 20 itself. When the switch fabric card 20 receives the control frame 412 at the predetermined time interval, the switch fabric card 20 determines that the connection with the line card 30, which is the partner, and the connection of the path 51 is in a normal state. When the switch fabric card 20 cannot receive the control frame 412 after an elapse of a predetermined time, the switch fabric card 20 determines that the connection with the line card 30, which is a partner, and the connection of the path 51 are in an abnormal state.

As a result of the checking of the normality of the connection according to the control frame communication, the path 51 determined to be normal and the lanes thereof are used for data transmission. However, the path 51 determined to be abnormal and the lanes thereof are not used for data transmission. The switch fabric card 20 does not use the port 221 connected to the path 51 connected with the line card 30 determined to be abnormal for data transmission executed thereafter. In addition, when the path 51 connected with the line card 30 determined to be abnormal once is determined to return to be normal, the switch fabric card 20 uses the port 221 connected to the path 51 for data transmission again. In other words, the port is added as a candidate for the transmission destination.

In FIG. 7, for example, the TMLSI 32 of LC1 that is the line card 30 transmits control frames 412 denoted by g1 and g2 to lanes of the paths 51 of p1 and p4 from the ports at a predetermined time interval. Meanwhile, the SWLSIs 22 of FC1 and FC2 that are switch fabric cards 20 receive control frames 412 from the port 221 connected to the path 51. For example, when the control frame 412 of g1 cannot be received from the path 51 of p1, the control communication unit 222 of the SWLSI 22 of FC1 determines that LC1 and the path 51 of p1 are abnormal and does not use LC1 and the path 51 of p1 for data transmission executed thereafter.

In addition, the function of the control frame communication executed in a direction from the line card 30 illustrated in FIG. 7 cannot control the stop of the switch fabric card 20 by using the SoC 23. Thus, a relay apparatus according to a modification example may be configured to have only the function of the control frame communication executed in the direction from the switch fabric card 20 illustrated in FIG. 6. However, it is preferable that the function of the control frame communication executed in the direction illustrated in FIG. 7 is included for the selection and the switching of the data transmission route.

[Switching of Route between FC to LC (1)]

An example relating to the selection and the switching of a route of data transmission at the time of an abnormal connection between the switch fabric card 20 and the line card 30 in the second communication network 50 will be described with reference to FIGS. 6 and 7.

In FIG. 6, an example of switching of a route at the time of an abnormal connection that corresponds to the control frame communication executed in the direction from the switch fabric card 20 is illustrated. A solid-line arrow 600 illustrates an example of the route of transmission from an apparatus that is a transmission source to A that is a terminal 4 of the destination at a normal time. The route 600 is a route starting from an apparatus of a transmission source, which is not illustrated in the diagram, to A that is the terminal 4 of the destination sequentially through the network 3, the relay apparatus 1, and X and Y that are the other relay apparatuses 2 illustrated in FIG. 1. This route, as a route of data transmission inside the relay apparatus 1, sequentially passes through LC1, p1, FC1, p2, and LC2.

LC1 receives a frame of which the destination from the apparatus of the transmission source is A from the network 3. LC1 transmits the frame, for example, with the transmission destination being set to FC1 from the port of p1 which is the path 51 thereof. FC1 receives the frame from the port of p1 and transmits the frame from the port of p2 which is the path 51 thereof, for example, with the transmission destination being set to LC2. LC2 receives the frame from the port of p2 and transmits the frame to X that is another relay apparatus 2. The frame is transmitted from X to Y and is transmitted to A that is the terminal 4 of the destination from Y.

A reference numeral 601 denotes, for example, an occurrence of a fault due to a disconnection or the like occurs in the path p1 between the FC1 and LC1. In such a case, in the control frame communication executed in the direction from the switch fabric card 20 described above, f1 that is the control frame 411 from FC1 to LC1 does not arrive. Accordingly, LC1 determines that FC1 and p1 are abnormal and does not use p1 for the data transmission. In other words, LC1 changes the transmission destination such that a path other than p1, for example, p4 connected with FC2 and a corresponding port are used. A reference numeral 602 illustrates switching of a route including the used path 51. Accordingly, the route after the switching inside the relay apparatus 1 sequentially passes through LC1, p4, FC2, p5, and LC2.

[Switching of Route between FC to LC (2)]

In FIG. 7, an example relating to the switching of a route at the time of an abnormal connection that corresponds to the control frame communication executed in the direction from the line card 30 is illustrated. It is assumed that the route at the normal time is 600.

A reference numeral 701 denotes, for example, an occurrence of a fault due to a disconnection or the like occurs in the path p2 between the FC1 and LC2. In such a case, in the control frame communication executed in the direction from the line card 30 described above, g3 that is the control frame 412 from LC2 to FC1 does not arrive. Accordingly, FC1 determines that LC1 and p2 are abnormal and does not use p2 for the data transmission. In other words, FC1 changes the transmission destination such that a path 51 other than p2, for example, p3 connected with LC3 and a corresponding port are used. A reference numeral 702 illustrates switching of a route including the used path 51. Accordingly, the route after the switching inside the relay apparatus 1 sequentially passes through LC1, p1, FC2, p3, and LC3. The route between the apparatuses after the switch goes from the relay apparatus 1 to A that is a destination terminal 4 through Y that is another relay apparatus 2.

In the example of 601 or 701 described above, relating to the switching of the route inside the relay apparatus 1, the management card 10 controls for the SWLSI 22 of the switch fabric card 20 by using the path 41 of the first communication network 40. In the cases illustrated in FIGS. 6 and 7, at the normal time, c1 to c4 that are the paths 41 in the first communication network 40 are in the normal state. For example, MC1 that is the management card 10 controls the SWLSI 22 of FC1 by using c1 and controls the SWLSI 22 of FC2 by using c2. Similarly, MC2 controls the SWLSI 22 of FC1 by using c3 and controls the SWLSI 22 of FC2 by using c4.

For example, the CPU 11 of MC1 transmits a control packet to the PCIeSW 21 of FC1 by using the control plane of c1. The PCIeSW 21 transmits the control packet to the SWLSI 22 through the path 26. The SWLSI 22 controls the state of the switch fabric card 20, a setting of the route of data transmission, and the like based on the control packet.

As in the example described above, relating to the control including the selection, the switching, and the like of the route of the data transmission inside the relay apparatus 1, the checking of the normality according to the control frame communication in the second communication network 50 and control communication in the first communication network 40 are executed.

Route information set to the SWLSI 22, in other words, the route of the transmission of the frame inside the relay apparatus 1 is set in the control process executed from the CPU 11 of the management card 10 for the SWLSI 22. For example, when switching to a connection between the relay apparatus 1 and an external device is made, automatically, the route information of the SWLSI 22 is updated so as to be switched to another route by the control process.

When the update of the route information of the SWLSI 22 is necessary, and there is a fault of the first communication network 40, since the communication for the control from the CPU 11 to the SWLSI 22 cannot be executed, the route information of the SWLSI 22 cannot be correctly updated. Accordingly, there is a possibility that the frame is transmitted in an incorrect route. Since such a state is not desirable, in order to realize a high degree of availability, the relay apparatus 1 according to the present embodiment, also in the case of a fault described above, realizes the control of the SWLSI 22 by utilizing the error control function, and the switching of the route and the like can be executed.

[Configuration without Error Control Function]

Figure 8:
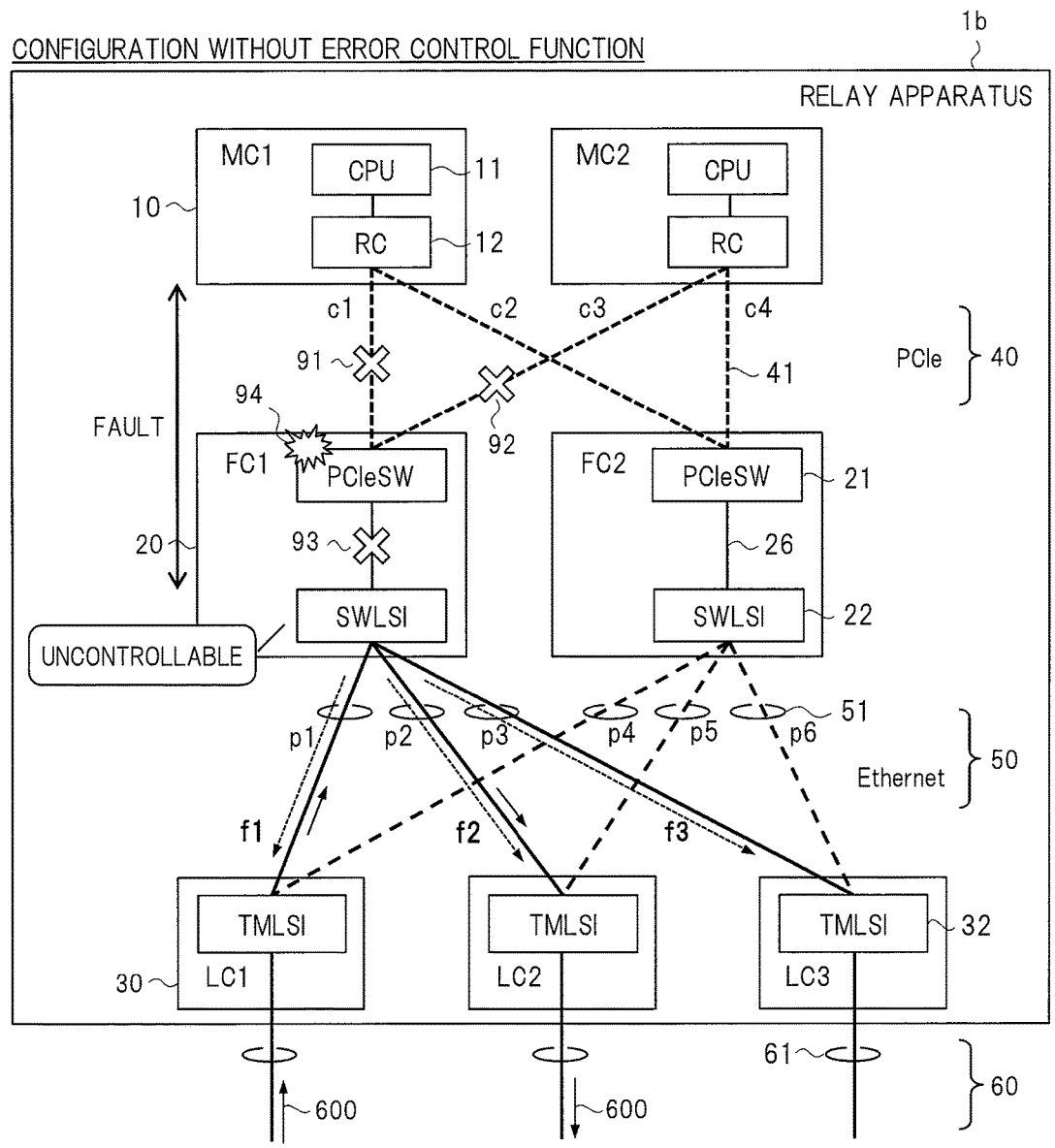
FIG. 8 is a diagram that illustrates a configuration of the relay apparatus according to the embodiment and a problem occurring when a malfunction between the management card and the switch fabric card occurs.

FIG. 8 illustrates a configuration without error control function as a relay apparatus 1b according to the embodiment and a problem at the time of a fault occurring in the first communication network 40 under the configuration. The configuration of the relay apparatus 1b illustrated in FIG. 8 is different from the configuration of the relay apparatus 1 illustrated FIG. 4 and the like such that an error control function according to the SoC 23 or the like is not included in the switch fabric card 20.

In the configuration of the relay apparatus 1b, the degree of availability is higher than that of the relay apparatus disclosed in the example of the related art of Patent Document 1 based on the redundant configuration of the management card 10 and the like. CPUs 11 of two management cards 10 control switch fabric cards 20 through a first communication network 40 according to the PCIe. Also in the case of an abnormality of one of the management cards 10, the other normal management card 10 can continue the control of the switch fabric cards 20.

In addition, due to a disadvantage in terms of miniaturization and the cost, the switch fabric card 20 does not have a CPU mounted thereon and is controlled by a CPU 11 mounted on the management card 10.

However, in the configuration of this relay apparatus 1b, in the case of a fault occurring between the management card 10 and the switch fabric card 20 in the first communication network 40, the communication of control from the CPU 11 of the management card 10 for the SWLSI 22 of the switch fabric card 20 cannot be executed.

As examples of the fault described above, reference numeral 91 denotes a disconnection or the like in c1 that is a path 41 between MC1 and FC1 among the paths 41 of the first communication network 40. Reference numeral 92 denotes a disconnection or the like in c3 that is a path 41 between MC2 and FC1. In addition, reference numeral 93 denotes a disconnection or the like of a path 26 between the PCIeSW 21 and the SWLSI 22 inside FC1. Reference numeral 94 denotes an abnormality such as a malfunction of the internal circuit of the PCIeSW 21 of FC1.

In the case of any one fault of 91, 93, and 94, MC1 cannot control the SWLSI 22 of FC1 by using the control plane of c1. Similarly, in the case of any one fault of 92, 93, and 94, MC2 cannot control the SWLSI 22 of FC1 by using the control plane of c3.

In the case of the faults described above, since FC1 that is the switch fabric card 20 can be determined to be in an abnormal state, for the realization of a high degree of availability, the relay apparatus 1b desires to manage and control FC1 as an abnormal state on the internal management function. However, since the relay apparatus 1b is in the state of being incapable of controlling the SWLSI 22 from the CPU 11 as described above, the relay apparatus 1b cannot stop data transmission to/from the line card 30 with FC1 being determined to be in the abnormal state.

In addition, in the case of a fault occurring in the path 41 of the first communication network 40 according to the PCIe as described above, the CPU 11 of the management card 10 may continuously wait for a response from the SWLSI 22 depending on the processing method, and an error of a stack or the like may occur.

[Error Control Function]

Figure 9:
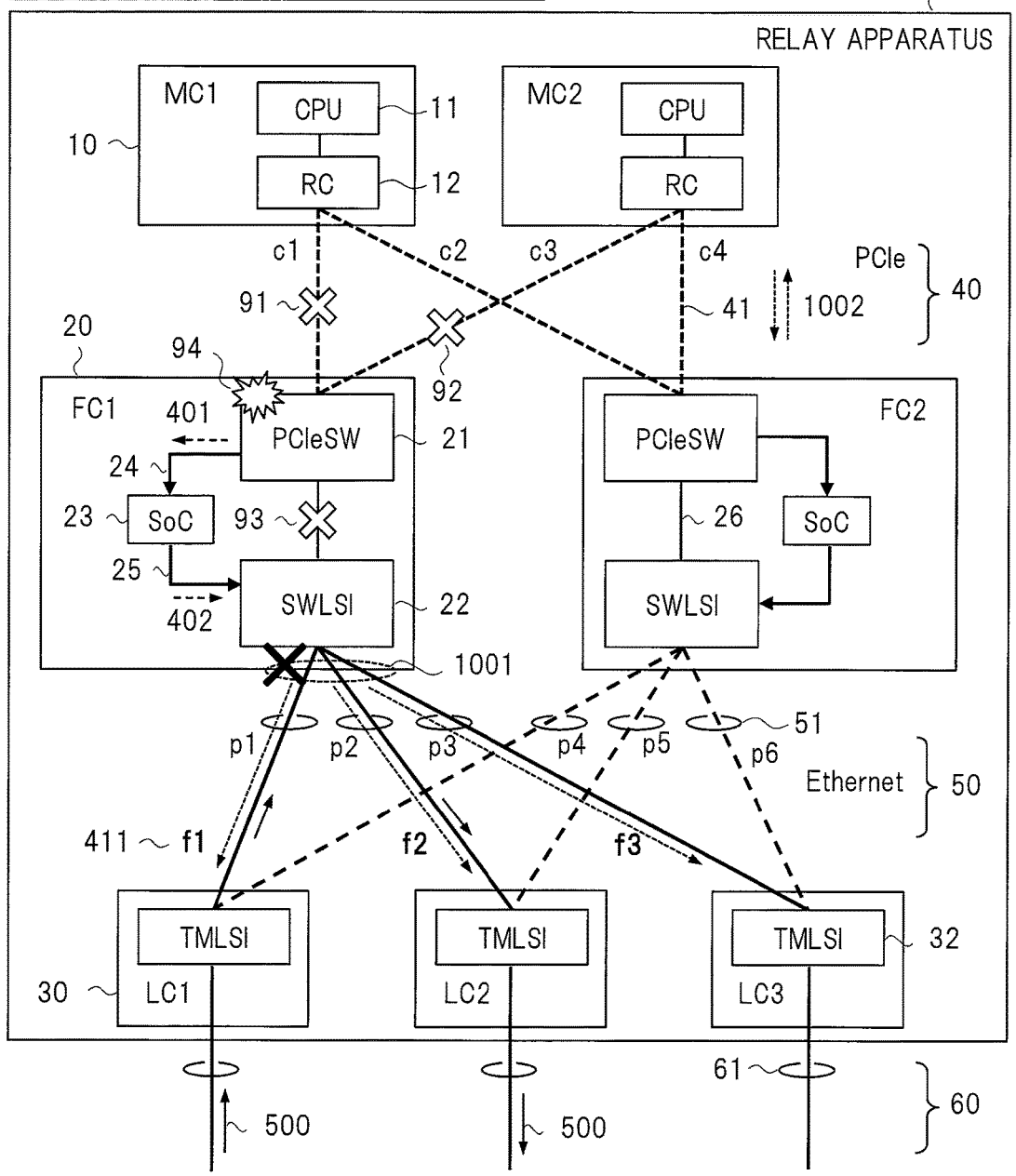
FIG. 9 is a diagram that illustrates control of the switch fabric card at the time of a malfunction of a first communication network in the configuration of the relay apparatus according to the embodiment.

FIG. 9 illustrates the control of the switch fabric card 20 at the time of a fault of the first communication network 40 under the configuration of the relay apparatus 1 according to an embodiment having the error control function described above. The relay apparatus 1 illustrated in FIGS. 4, 10, and the like has a configuration having an error control function according to the SoC or the like, which is devised based on the configuration illustrated in FIG. 8. Thus, also in the case of faults as represented in reference numerals 91 to 94 illustrated in FIG. 8, the relay apparatus 1 can stop data transmission to/from the line card 30 by determining the switch fabric card 20 to be in the abnormal state.

In FIG. 9, it is assumed that, for example, any one fault of 91, 93, and 94 occurs between the management card 10 and the switch fabric card 20 in the first communication network 40 according to the PCIe. Thus, a state is formed in which control cannot be executed from the CPU 11 of MC1 that is the management card 10 for the SWLSI 22 of FC1 that is the switch fabric card 20. In addition, here, it is assumed that the MC1 is in the current-use state, and MC2 is in the preliminary state as an example. Also when MC1 is in the preliminary state, and MC2 is in the current-use state or when both MC1 and MC2 are in the current-use state, a state is formed in which the control of the SWLSI 22 of FC1, similarly, cannot be executed depending on the situation of the faults 91 to 94.

Like the faults described above, in the case of a situation in which the SWLSI 22 of the switch fabric card 20 cannot be controlled from any management card 10, the relay apparatus 1 according to the present embodiment operates as below. The PCIeSW 21 of the FC1 detects a fault, for example, the fault 91 by using the error detecting unit 212 and automatically outputs an error signal 401 to the error signal line 24. The SoC 23 receives the error signal 401 as an input and, as described above, records the log information and outputs the stop signal 402 to the stop signal line 25. The SWLSI 22 receives the stop signal 402 as an input and recognizes an abnormal state of FC1 and stops the transmission of the control frame 411 that is executed by the control communication unit 222.

Here, reference numeral 1001 denotes the stop of transmission of f1 to f3 that are control frames 411 in p1 to p3 that are paths 51 from the SWLSI 22 of FC1 to LC1 to LC3 that are the line cards 30. Accordingly, since the control frame 411 does not arrive at the TMLSI 32, LC1 to LC3 that are the line cards 30 determines the path 51 corresponding to FC1 to be abnormal and does not use the port corresponding to the path 51 for the data transmission. For example, LC1, as in the example illustrated in FIG. 6, switches the route inside the relay apparatus 1 not to FC1 as the transmission destination but to a route using FC2.

As a result thereof, the relay apparatus 1 manages FC1 that is the switch fabric card 20 corresponding to the fault as an abnormal state on the internal management function and can stop the switching operation for data transmission of FC1 and the operation of data transmission to/from each line card 30. In addition, since the control process is not a technology of turning off the power or disconnecting an electrical connection of the card such as FC1, a loss in the transmission data does not occur. While the example described above is in the case of a fault occurring on the FC1 side, also in the case of a fault occurring on the FC2 side, a similar control process can be realized.

As described above, also in case a fault for which communication for control between the management card 10 and the switch fabric card 20 cannot be executed, the relay apparatus 1 according to the present embodiment generates the error signal 401 at a hardware level from the PCIeSW 21 to the SoC 23. Then, based on the error signal 401, the stop signal 402 is generated from the SoC 23 to the SWLSI 22. Accordingly, the communication of the control frame of the SWLSI 22 is stopped. As a result, data transmission between the switch fabric card 20 and the line card 30 is stopped. Also in a situation in which control using the management card 10 cannot be executed, the relay apparatus 1 can manage and control the switch fabric card 20 as an abnormal state as an internal management function.

[Structure for Detecting Fault and Outputting Error Signal]

The structure for detecting the fault and outputting the error signal 401 in the switch fabric card 20 of the relay apparatus 1 will be supplemented. The PCIeSW 21, particularly, the error detecting unit 212 has a function of detecting a fault of the path 41 of the PCIe. When any one of the faults as in the examples of 91 to 94 occurs, according to the detection made by the error detecting unit 212, the error signal line 24 that is a hardware line is in the asserted state. In other words, a state is formed in which the error signal 401 is output. In the PCIe, a state in which the signal line is valid, for example, the voltage level is high is called an asserted state or an invalid state, and, for example, a state in which the voltage level is low is called a deasserted state or a negate state. Similarly, according to the asserting of the stop signal line 25, a state is formed in which the stop signal 402 is output. Accordingly, the control frame communication of the SWLSI 22 is automatically stopped.

Similar to the examples of 91 and 92, the detection of a fault of a case where the signal line that is the path 41 according to the PCIe bus is disconnected is as follows. The PCIeSW 21 links, in other words, mutually connects the RC 12 connected to the CPU 11 of the management card 10 and the SWLSI 22 of the switch fabric card 20. In the PCIe, even in a state in which there is no packet to be exchanged, in order to maintain a link state, packets and symbols are continuously transmitted and received. In FIG. 9, packets and symbols transmitted and received on the control pane of the path 41 using the PCIe bus between the RC 12 and the PCIeSW 21 are denoted by 1002.

According to the PCIe, in a port, when a normal packet or a normal symbol is received, a "link up" state is formed, and otherwise, a "link down" state is formed. In the PCIe, the normality of a packet is monitored using the CRC. As a result, the normality or the abnormality of a packet on the path 41 can be determined, and, in other words, a fault of the path 41 can be detected. A fault of the path 26 can be also detected similarly.

The PCIeSW 21 has a function for giving a notification through a hardware line when an abnormal packet or an abnormal symbol is received or when the state transits to the "link down" state. Thus, the PCIeSW 21 can detect a fault or an abnormality of the signal line that is the path 41. The signal line that is the path 41 is a signal transmission channel including a connector.

The error detecting unit 212 of the PCIeSW 21 detects a transition of the path 41 and the port to the link down state or detects a fault of the path 41 by using a CRC error of the packet and automatically outputs the error signal 401 by setting the error signal line 24 to be in the asserted state.

As in the example of 94, a fault detection in the case of an abnormality of the internal circuit of the PCIeSW 21 as follows. The PCIeSW 21 checks and assures the soundness of data of the internal buffer or the like by using an ECC. The PCIeSW 21 has a function of giving a notification through a hardware line when an uncorrectable error of the ECC occurs. Accordingly, the PCIeSW 21 can detect an internal abnormality such as a malfunction of the device.

The error detecting unit 212 of the PCIeSW 21 checks the soundness of data of the internal buffer or the like of the PCIeSW 21 by using the ECC and automatically outputs the error signal 401 with the error signal line 24 being set to be in the asserted state when an uncorrectable ECC error occurs.

In addition, also when an electrical abnormality such as formation of a short circuit of wirings in the internal circuit of the PCIeSW 21 occurs, as the standard of the PCIe device, the hardware line used for giving a notification of an abnormality is in the asserted state. Accordingly, a detection of an abnormality such as formation of a short circuit of the wirings can be similarly made. Here, the internal error of the PCIeSW 21 is a fatal error, and the PCIeSW 21 autonomously stops the operation and is not restored until a reset is applied through a manual operation.

[Restoration Means]

In the case of a fault of the path 41 in the first communication network 40 or a fault such as a malfunction of the internal circuit of the switch fabric card 20, the fault is a fatal error when the fault is not resolved even when the whole relay apparatus 1 is reset or power is re-input by a final user. For this reason, the relay apparatus 1 according to the present embodiment, in the case of such an error, as a restoration means, the error is restored not by the final user but by a user executing support in other words, operation/maintenance/management. The user executing the operation/maintenance/management checks the error state including the place and the kind of the fault by referring to the log information stored in the SoC 23 of the switch fabric card 20. Then, the user replaces a PCIe cable, the PCIeSW 21 of the switch fabric card 20, or the like corresponding to the place of the fault.

[Distribution Function]

A case will be described in which a distribution process of data transmission of frames between the switch fabric card 20 and the line card 30 in the second communication network 50. According to the redundant configuration of each card, the relay apparatus 1 has a high degree of reliability and a function for executing a distribution process of data transmission of the frames. For example, two switch fabric cards 20 and three line cards 30 illustrated in FIG. 6, a plurality of data frames that are transmission targets are distributed by using both FC1 and FC2 as the transmission destinations. In other words, FC1 and FC2 to which the current-use state is set become distribution destinations.

For example, when a plurality of data frames are transmitted from LC1 to LC2 in the data transmission of 600, a route passing through p1 and p2 that are paths 51 connected with FC1 and a route passing through p4 and p5 that are paths 51 connected with FC2 can serve as the distribution destinations. In addition, as a method for determining the switch fabric card 20 of the distribution destination of each frame, any one of various methods may be used. For example, there are a method using the transmission source of the frame or the MAC address of the destination, a method using a hash value of the frame, and the like.

Also when the distribution function is used, the control process according to the error control function according to the present embodiment is effectively applied. For example, when a fault of the example of 91 or the like of the first communication network 40 occurs when data transmission is executed using FC1 and FC2 as the distribution destination, for example, the control frame communication of the SWLSI 22 of FC1 is stopped according to the stop signal 402 that is based on the error signal 401. Accordingly, the line card 30 that has transmitted data by using FC1 as the distribution destination recognizes FC1 to be in an abnormal state and excludes FC1 and the path 51 from the distribution destinations. In other words, the line card 30 reduces the transmission destinations to only FC2 and continues the data transmission.

Configuration Example of PCIeSW

Figure 10:
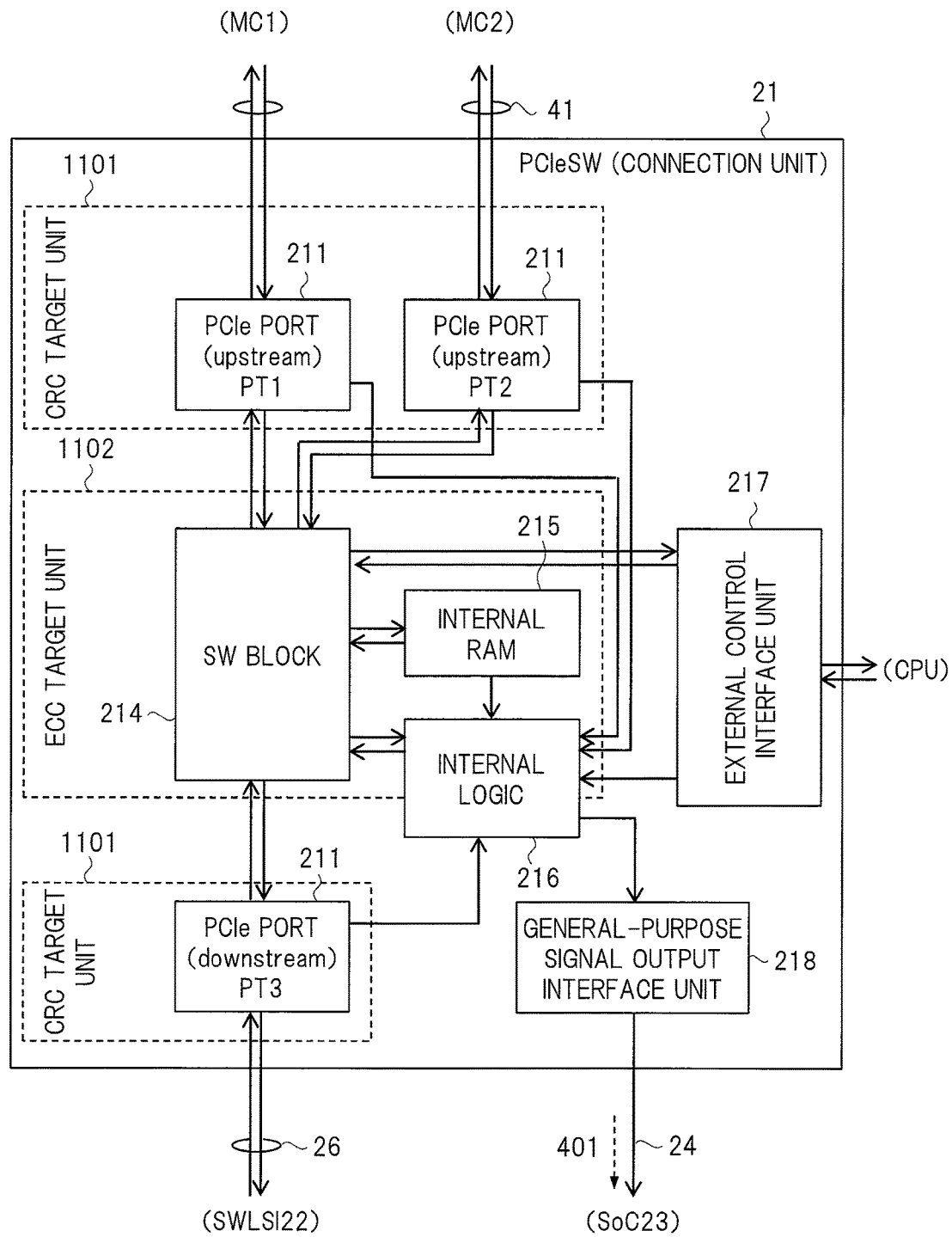
FIG. 10 is a diagram that illustrates an example of a configuration of a PCIeSW of the relay apparatus according to the embodiment.

FIG. 10 illustrates an example of a more detailed internal configuration of the PCIeSW 21 that is a connection unit of the relay apparatus 1. The PCIeSW 21 includes PT1 and PT2 that are two PCIe ports on the upstream side connected to the management card 10 that is a host and PT3 that is a PCIe port on the downstream side that is connected to the SWLSI 22 as the ports 211. In addition, PT1 is connected to the path 41 connected with MC1 that is the first host, and PT2 is connected to the path 41 connected with MC2 that is the second host. PT3 is connected to the path 26 connected with SWLSI 22.

In addition, the PCIeSW 21 includes a SW block 214, internal RAM 215, an internal logic 216, an external control interface unit 217, and a general-purpose signal output interface unit 218. The SW block 214 transmits a PCIe packet between the ports 211 of the upstream and the downstream. The internal RAM 215 stores internal data of the PCIeSW 21 and a program. The internal logic 216 is an internal processing logic of the PCIeSW 21.

The external control interface unit 217 is an input/output interface unit between the PCIeSW 21 and an external CPU. The general-purpose signal output interface unit 218 is an interface unit that outputs a general-purpose signal to the outside of the PCIeSW 21. In the present embodiment, an error signal 401 that is one of general-purpose signals is output from the general-purpose signal output interface unit 218 to the SoC 23 by using the error signal line 24.

The port 211 is a CRC target unit 1101. In other words, the presence/absence of an abnormality of the port 211 is tested by using the CRC. When there is an abnormality in the data transmission of the port 211, the corresponding path 41, and the path 26, an error can be detected based on the value of the CRC. When an abnormality of the port 211, the corresponding path 41, or the path 26 is detected based on the CRC, an error signal 401 is output through the general-purpose signal output interface unit 218.

The SW block 214, the internal RAM 215, and the internal logic 216 are ECC target units 1102. In other words, when an error of data, in other words, an abnormality such as a malfunction of the circuit or the like occurs in such parts, an error is detected using the ECC. When an abnormality of such a part is detected based on the ECC, an error signal 401 is output through the general-purpose signal output interface unit 218.

In the configuration illustrated in FIG. 10, the error detecting unit 212 described above is realized by the structure of the CRC and the ECC, the general-purpose signal output interface unit 218, and the like.

Configuration Example of SWLSI

Figure 11:
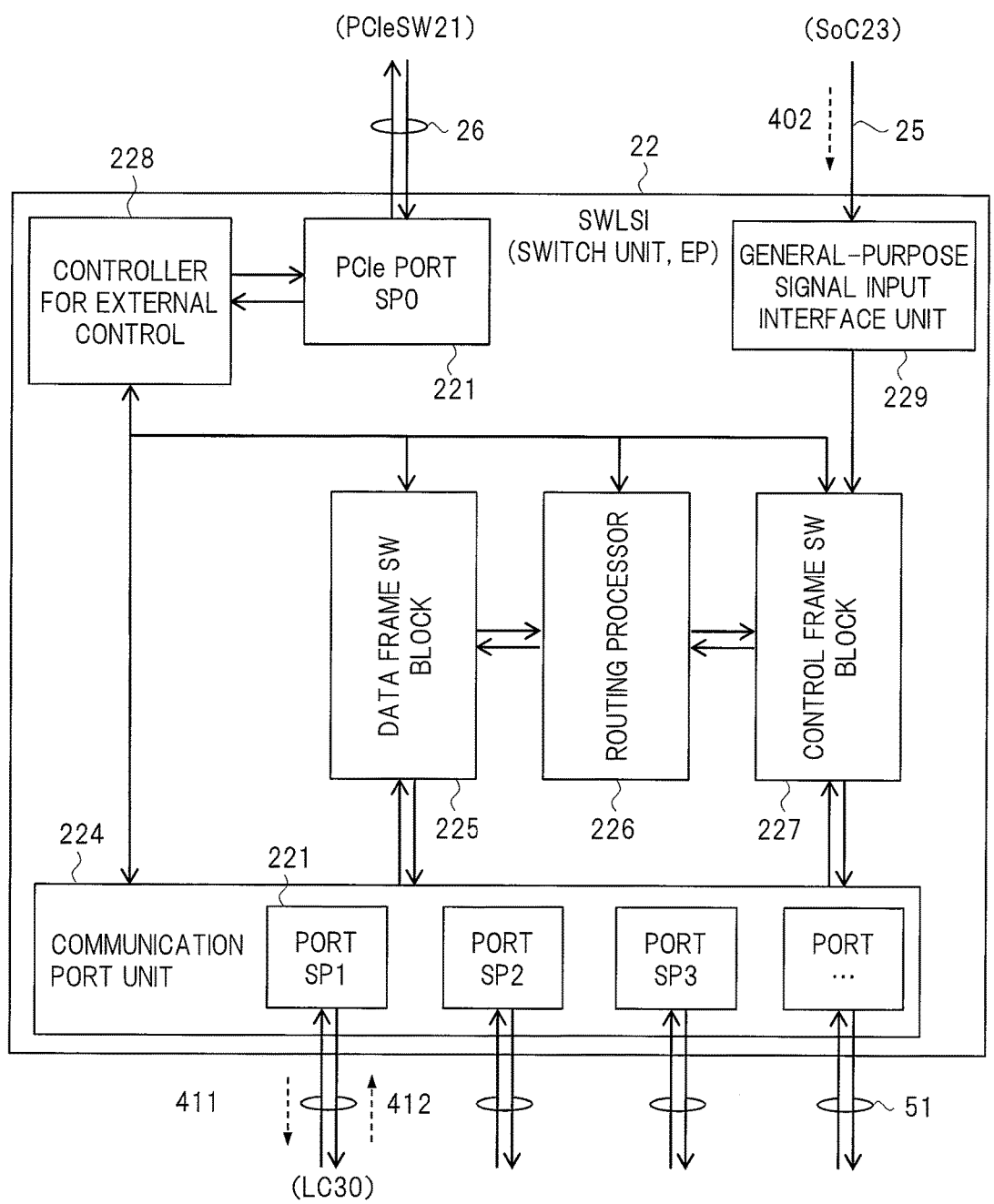
FIG. 11 is a diagram that illustrates an example of a configuration of a SoC of the relay apparatus according to the embodiment.

FIG. 11 illustrates an example of a more detailed internal configuration of the SWLSI 22 that is a switching unit of the relay apparatus 1. The SWLSI 22 includes SP0 that is a PCIe port connected to the path 26 connected with the PCIeSW 21, SP1, SP2, and SP3 that are a plurality of ports of the communication port unit 224 connected to the path 51 that is on the line card 30 side, and the like as the ports 221. In addition, the SWLSI 22 includes a data frame SW block 225, a routing processor 226, a control frame SW block 227, an external control controller 228, and a general-purpose signal input interface unit 229.

The data frame SW block 225 transmits a data frame between the ports 221. The data frame is a frame including user data. The routing processor 226 executes the process of controlling the route of transmission of a data frame and a control frame. The control frame SW block 227 transmits control frames between the ports 221. The control frame is a frame that includes control information. The control frame SW block 227 has a function of transmitting the control frame 411 described above from the port 211 of the communication port unit 214 and a function of receiving the control frame 412 from the port 211.

The external control controller 228 is connected to SP0 that is the port 221 on the PCIeSW 21 side and executes a control process of the SWLSI 22 according to the reception of a PCIe control packet transmitted from the management card 10. The general-purpose signal input interface unit 229 is an interface unit that receives a general-purpose signal as an input from the outside of the SWLSI 22. In the present embodiment, the general-purpose signal input interface unit 229 inputs a stop signal 402 from the SoC 23 as one of general-purpose signals by using the stop signal line 25.

The mechanism of the control communication unit 222 and the like described above is realized by the general-purpose signal input interface unit 229 and the control frame SW block 227, and the like in the configuration illustrated in FIG. 11.

Configuration Example of SoC

Figure 12:
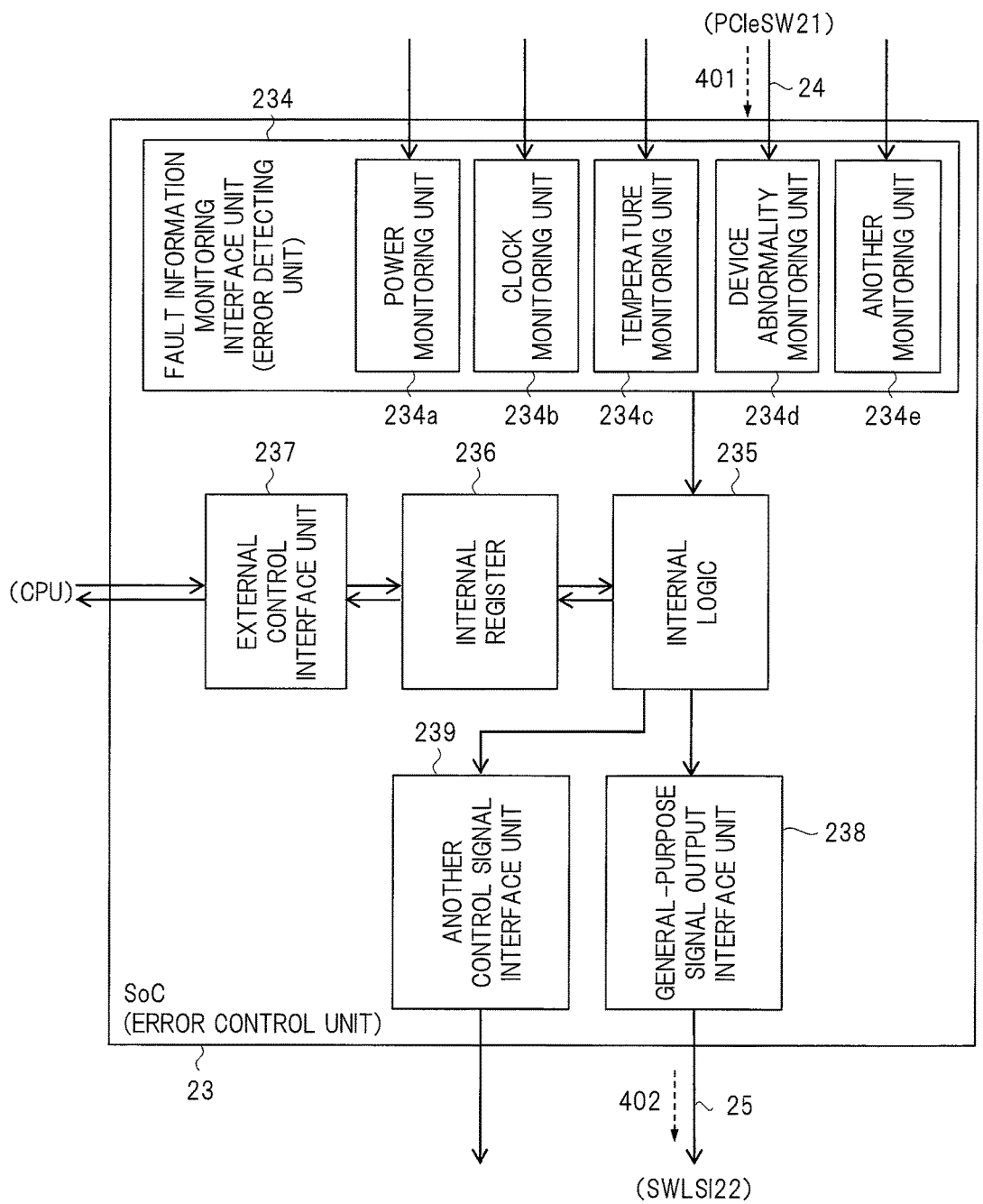
FIG. 12 is a diagram that illustrates an example of a configuration of a SoC of the relay apparatus according to the embodiment.

FIG. 12 illustrates an example of a more detailed internal configuration of the SoC 23 that is an error control unit of the relay apparatus 1. The SoC 23 includes a fault information monitoring interface unit 234, an internal logic 235, an internal register 236, an external control interface unit 237, a general-purpose signal output interface unit 238, and another control signal interface unit 239.

The fault information monitoring interface unit 234 includes a power monitoring unit 234a, a clock monitoring unit 234b, a temperature monitoring unit 234c, a device abnormality monitoring unit 234d, and another monitoring unit 234e. The fault information monitoring interface unit 234 is an interface unit that receives and monitors external fault information by using each monitoring unit and detects an external fault. The power monitoring unit 234a monitors and detects an abnormality of power. The clock monitoring unit 234b monitors and detects an abnormality of the clock. The temperature monitoring unit 234c monitors and detects an abnormality of the temperature. The device abnormality monitoring unit 234d monitors and detects an abnormality of the device. The other monitoring unit 234e monitors and detects abnormalities of the other kinds.

In the present embodiment, the device abnormality monitoring unit 234d receives an error signal 401 from the PCIeSW 21 by using the error signal line 24 as an input and, by using the error signal, detects an abnormality of the internal circuit of the PCIeSW 21 and an abnormality of the port 211 or the path 41.

When an abnormality or a fault has been detected by each monitoring unit, the fault information monitoring interface unit 234 provides the detected fault information for the internal logic 235. The internal logic 235 records the fault information in the internal register 236 and provides the fault information for the general-purpose signal output interface unit 238 and the other control signal interface unit 239. The general-purpose signal output interface unit 238 outputs the stop signal 402 to the SWLSI 22 by using the stop signal line 25 in the case of a fault of the PCIeSW 21.

The external control interface unit 237 is an interface unit of an input/output between the SoC 23 and an external CPU. The external control interface unit 237 reads the fault information recorded in the internal register 236 according to an access from the external CPU. The general-purpose signal output interface unit 238 is an interface unit that outputs a general-purpose signal to the outside of the SoC 23. In the present embodiment, the stop signal 402 as one of general-purpose signals is output from the general-purpose signal output interface unit 238 to the SWLSI 22 by using the stop signal line 25.

The error signal inputting unit 231 illustrated in FIG. 5 described above is realized by the fault information monitoring interface unit 234 in the configuration illustrated in FIG. 12. The log recording unit 232 is realized by the internal logic 235, the internal register 236, and the like. The stop signal outputting unit 233 is realized by the general-purpose signal output interface unit 238 and the like.

The SoC 23 also has the following functions. The SoC 23 can monitor states such as power, the clock, and the temperature. Based on the monitoring, when such a state is abnormal, in other words, when there is a possibility that the transmission of packets that is the main function of the switch fabric card 20 does not normally operate, the SoC 23 can temporarily stop communication of a control frame by outputting the stop signal 402 to the SWLSI 22.

Effects and the Like

As described above, according to the relay apparatus 1 of the present embodiment, also when a fault or the like occurs between the management card 10 and the switch fabric card 20, the switch fabric card 20 can be controlled as an abnormal state, whereby a high degree of availability can be realized. Particularly, also when communication for control cannot be executed due to a fault between the CPU 11 and the SWLSI 22, data transmission to/from the line card 30 using the switch fabric card 20 can be stopped.

In addition, the relay apparatus 1 according to the present embodiment is not a technology for turning off the power of the switch fabric card 20 at the time of an occurrence of a fault, and accordingly, there is no loss of the transmission data due to turning the power off.

Other Embodiments

Figure 13:
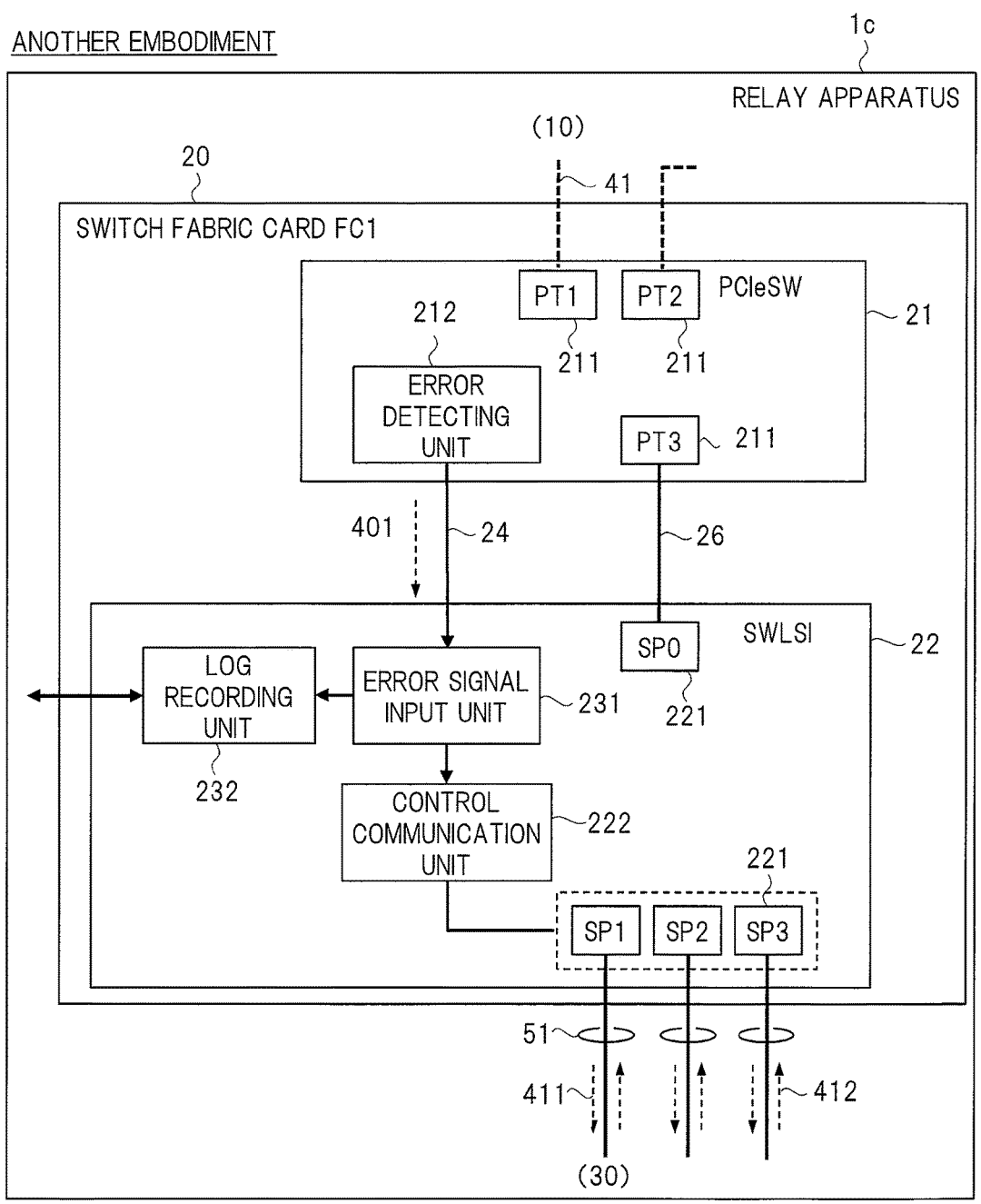
FIG. 13 is a diagram that illustrates an example of a configuration of a switch fabric card of a relay apparatus according to another embodiment.

FIG. 13 illustrates the configuration of a switch fabric card 20 of a relay apparatus 1c according to another embodiment. The configuration of this relay apparatus 1c is a configuration acquired by integrating elements such as the SoC 23 and functions into the inside of the PCIeSW 21 and the SWLSI 22 in the configuration of the relay apparatus 1 described above. The PCIeSW 21 has the same configuration as that illustrated in FIG. 5, detects a fault of the first communication network 40 as an error by using the error detecting unit 212, and outputs the error signal 401 as a control signal to the error signal line 24. The error signal line 24 is connected to the error signal inputting unit 231 disposed inside the SWLSI 22.

In addition to the constituent elements illustrated in FIG. 5, the SWLSI 22 includes: an error signal inputting unit 231 and a log recording unit 232. The error signal inputting unit 231 is connected to the log recording unit 232 and the control communication unit 222. When the error signal 401 is received as an input, the error signal inputting unit 231 outputs the error signal 401 to the log recording unit 223 and the control communication unit 222. The log recording unit 232, as described above, records the log information including the error signal 401. In the present embodiment, the stop signal 402 is omitted.

When the error signal 401 is received as an input, the control communication unit 222 recognizes the abnormal state of the switch fabric card 20, analyzes as a stop signal, and, as described above, stops the transmission of the control frame 411 from the port 221.

As another embodiment, the error detecting unit 212 may be disposed outside the PCIeSW 21. In addition, the log recording unit 232 may be disposed at a different position, for example, on the inside of the PCIeSW 21, the outside of the switch fabric card 20, or the like.

As another embodiment, the method of checking the normality of the connection between the switch fabric card 20 and the line card 30 is not limited to the example of the control frame communication illustrated in FIG. 6 and the like, but any other method may be applied. In such a case, the control communication unit 222 of the SWLSI 22 executes communication according to the applied different method. For example, the SWLSI 22 transmits a predetermined control signal from the port and waits for a control signal from the TMLSI 32 as a response. When the control signal has been received as the response, the SWLSI 22 determines that the line card 30 of the partner and the path 51 to be normal. On the other hand, when the control signal as the response has not been received, the SWLSI 22 determines that the line card 30 of the partner and the path 51 to be abnormal. At the time of the error described above, the stop signal 402 that is based on the error signal 401 is input to the SWLSI 22. The SWLSI 22 recognizes own switch fabric card 20, for example, FC1 to be in an abnormal state and transmits, for example, a predetermined control signal delivering an abnormal state of the switch fabric card 20 to each line card 30 as communication for control according to the applied method. When the control control signal is received, the TMLSI 32 of each line card 30 recognizes the abnormal state of the switch fabric card 20 of the partner and stops data transmission using the path 51 connected with the switch fabric card 20.

As a further another embodiment, a configuration in which a single management card 10 is used may be employed. In case of such a configuration, when a fault occurs in a path 41 between the single management card 10 and a certain switch fabric card 20, the error signal 401 described above is generated, and data transmission between the switch fabric card 20 and each line card 30 is stopped.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be used as a LAN of an organization, a switch in a wide area communication network, and others.

What is claimed is:

1. A relay apparatus comprising:
a plurality of line cards configured to execute data transmission;
a plurality of switch fabric cards configured to switch the data transmission; and
a management card including a processor that controls the plurality of switch fabric cards, wherein
the management card and the plurality of switch fabric cards are connected through a first communication network,
the plurality of switch fabric cards and the plurality of line cards are connected through a second communication network,
the switch fabric card includes an error detecting unit and an error control unit,
the error detecting unit detects a fault of the first communication network or an internal fault of the switch fabric cards as an error and outputs an error signal,
the error control unit stops the switching of the data transmission using a path of the second communication network by controlling the switch fabric cards to be in an abnormal state based on the error signal,
the management card is a plurality of management cards and includes a communication unit that is connected to a path of the first communication network,
each of the line cards includes a transmission unit that includes a port connected to a path and a port connected to the path of the second communication network,
each of the switch fabric cards includes:
a switching unit including a port connected to the path of the second communication network and switching the data transmission,
a connection unit including a port connected to the path of the first communication network and connecting the communication unit and the switching unit, and
the switching unit recognizes the switch fabric cards to be in an abnormal state based on the error signal and stops the switching of the data transmission using the port connected to the path of the second communication network,
wherein the switch fabric card includes:
a path connecting the control unit and the switching unit;
a first hardware line connecting the error detecting unit and the error control unit; and
a second hardware line connecting the error control unit and the switching unit,
the error detecting unit detects a fault of the first communication network or an internal fault of the switch fabric card as an error and outputs an error signal using the first hardware line,
wherein the error control unit includes:
a stop signal outputting unit that outputs a stop signal based on the error signal using the second hardware line, and
when the switching unit receives the stop signal as an input, the switching unit recognizes the switch fabric cards to be in an abnormal state and stops the switching of the data transmission using the part connected to the path of the second communication network.

2. The relay apparatus according to claim 1, wherein the error control unit includes:
a log recording unit that records log information including the error signal and allows the log information to be referable from the outside.

3. The relay apparatus according to claim 1,
wherein the error detecting unit is disposed inside the connection unit and detects a fault of the path as an error by testing data in the port connected to the path of the first communication network including the path of the connection unit and the switching unit.

4. The relay apparatus according to claim 1,
wherein the error detecting unit is disposed inside the connection unit and detects a fault including a malfunction of the internal circuit of the connection unit as an error by detecting an error of data of an internal circuit of the connection unit.

5. The relay apparatus according to claim 1, wherein the switching unit of each of the switch fabric cards includes a control communication unit that executes communication for checking a normality of a connection in the path of the second communication network between the transmission unit of each of the plurality of line cards and the switching unit, and
when the error signal is received as an input, the switching unit causes each of the line cards to recognize an abnormal state of each of the switch fabric cards and stops data transmission using the path of the second communication network to/from each of the switch fabric cards through communication executed by the control communication unit.

6. The relay apparatus according to claim 5,
wherein the switching unit of each of the switching fabric cards transmits a control frame at a predetermined time interval by using the path of the second communication network to each of the transmission units of the plurality of line cards through communication executed by the control communication unit at a normal time and stops the transmission of the control frame when the error signal is received as an input, and
each of the line cards determines the path to be normal when the control frame is received through the path of the second communication network by using the transmission unit, and determines the path to be abnormal when the control frame is not received and does not allow the path determined to be abnormal not to be used for the data transmission.

7. A relay apparatus comprising:
a plurality of line cards for executing data transmission;
a plurality of switch fabric cards for switching the data transmission; and
a management card including a processor that controls the plurality of switch fabric cards, wherein the management card and the plurality of switch fabric cards are connected through a first communication network,
the plurality of switch fabric cards and the plurality of line cards are connected through a second communication network,
the switch fabric card includes an error detecting unit and an error control unit,
the error detecting unit detects a fault of the first communication network or an internal fault of the switch fabric cards as an error and outputs an error signal,
the error control unit stops the switching of the data transmission using a path of the second communication network by controlling the switch fabric cards to be in an abnormal state based on the error signal,
the management card is a plurality of management cards and includes a communication unit that is connected to a path of the first communication network,
each of the line cards includes a transmission unit that includes a port connected to a path and a port connected to the path of the second communication network,
each of the switch fabric cards includes:
a switching unit including a port connected to the path of the second communication network and switching the data transmission, and
a connection unit including a port connected to the path of the first communication network and connecting the communication unit and the switching unit,
the switching unit recognizes the switch fabric cards to be in an abnormal state based on the error signal and stops the switching of the data transmission using the port connected to the path of the second communication network,
the error detecting unit detects a fault of the first communication network or an internal fault of the switch fabric card as an error and outputs an error signal using a hardware line,
the error control unit includes:
a log recording unit that records log information including the error signal and allows the log information to be referable from the outside, and
a stop signal outputting unit that outputs a stop signal based on the error signal using a hardware line, and wherein
when the switching unit receives the stop signal as an input, the switching unit recognizes the switch fabric cards to be in an abnormal state and stops the switching of the data transmission using the port connected to the path of the second communication network.

* * * * *